United States Patent
Stiglic et al.

(10) Patent No.: US 10,477,188 B2
(45) Date of Patent: Nov. 12, 2019

(54) SYSTEM AND METHOD FOR GENERATING VIDEOS

(71) Applicant: LANDA CORPORATION LTD., Rehovot (IL)

(72) Inventors: Dragan Stiglic, Rehovot (IL); Noam Harel, San Francisco, CA (US)

(73) Assignee: LANDA CORPORATION LTD., Rehovot (IL)

(*) Notice: Subject to any disclaimer, the term of this patent is extended or adjusted under 35 U.S.C. 154(b) by 267 days.

(21) Appl. No.: 15/434,126

(22) Filed: Feb. 16, 2017

(65) Prior Publication Data
US 2017/0244956 A1    Aug. 24, 2017

(30) Foreign Application Priority Data
Feb. 18, 2016 (GB) .................... 1602877.1

(51) Int. Cl.
| | |
|---|---|
| H04N 13/275 | (2018.01) |
| H04N 13/156 | (2018.01) |
| G09B 5/06 | (2006.01) |
| G09B 9/00 | (2006.01) |
| G11B 27/036 | (2006.01) |
| H04N 7/18 | (2006.01) |

(Continued)

(52) U.S. Cl.
CPC .......... *H04N 13/275* (2018.05); *G09B 5/065* (2013.01); *G09B 9/00* (2013.01); *G11B 27/036* (2013.01); *H04N 5/232* (2013.01); *H04N 5/23206* (2013.01); *H04N 7/181* (2013.01); *H04N 13/156* (2018.05); *H04N 21/85* (2013.01)

(58) Field of Classification Search
CPC .................................................. H04N 13/275
USPC ......................................................... 386/278
See application file for complete search history.

(56) References Cited

U.S. PATENT DOCUMENTS

| | | |
|---|---|---|
| 3,898,670 A | 8/1975 | Erikson et al. |
| 4,009,958 A | 3/1977 | Kurita et al. |
| 4,093,764 A | 6/1978 | Duckett et al. |

(Continued)

FOREIGN PATENT DOCUMENTS

| | | |
|---|---|---|
| CN | 104618642 A | 5/2015 |
| DE | 102010060999 A1 | 6/2012 |

(Continued)

OTHER PUBLICATIONS

Geometrical Patterns for Diagrid Buildings by Montuori, Giovanni Maria; Mele, Elena; Brandonisio, Giuseppe; De Luca, Antonello. In Engineering Structures. Jul. 15, 2014 (Year: 2014).*

(Continued)

*Primary Examiner* — William C Vaughn, Jr.
*Assistant Examiner* — Daniel T Tekle
(74) *Attorney, Agent, or Firm* — Marc Van Dyke; Fourth Dimension IP

(57) ABSTRACT

A system comprising a processor configured to: provide a master Three-Dimensional (3D) scene; insert at least one source video feed into at least one position within the master 3D scene, allowing a configuration in which at least a first part of the master 3D scene is in front of the source video feed and at least a second part of the master 3D scene is behind the source video feed; and generate a combined video of the master 3D scene with the at least one source video feed inserted therein.

8 Claims, 16 Drawing Sheets

(51) Int. Cl.
*H04N 5/232* (2006.01)
*H04N 21/85* (2011.01)

(56) References Cited

U.S. PATENT DOCUMENTS

| | | |
|---|---|---|
| 4,535,694 A | 8/1985 | Fukuda |
| 4,538,156 A | 8/1985 | Durkee et al. |
| 4,976,197 A | 12/1990 | Yamanari et al. |
| 5,012,072 A | 4/1991 | Martin et al. |
| 5,099,256 A | 3/1992 | Anderson |
| 5,305,099 A | 4/1994 | Morcos |
| 5,352,507 A | 10/1994 | Bresson et al. |
| 5,365,324 A | 11/1994 | Gu et al. |
| 5,406,884 A | 4/1995 | Okuda et al. |
| 5,471,233 A | 11/1995 | Okamoto et al. |
| 5,552,875 A | 9/1996 | Sagiv et al. |
| 5,587,779 A | 12/1996 | Heeren et al. |
| 5,613,669 A | 3/1997 | Grueninger |
| 5,614,933 A | 3/1997 | Hindman et al. |
| 5,623,296 A | 4/1997 | Fujino et al. |
| 5,660,108 A | 8/1997 | Pensavecchia |
| 5,677,719 A | 10/1997 | Granzow |
| 5,698,018 A | 12/1997 | Bishop et al. |
| 5,841,456 A | 11/1998 | Takei et al. |
| 5,884,559 A | 3/1999 | Okubo et al. |
| 5,978,631 A | 11/1999 | Lee |
| 6,009,284 A | 12/1999 | Weinberger et al. |
| 6,024,018 A | 2/2000 | Darel et al. |
| 6,033,049 A | 3/2000 | Fukuda |
| 6,055,396 A | 4/2000 | Pang |
| 6,059,407 A | 5/2000 | Komatsu et al. |
| 6,102,538 A | 8/2000 | Ochi et al. |
| 6,108,513 A | 8/2000 | Landa et al. |
| 6,195,112 B1 | 2/2001 | Fassler et al. |
| 6,196,674 B1 | 3/2001 | Takemoto |
| 6,213,580 B1 | 4/2001 | Segerstrom et al. |
| 6,234,625 B1 | 5/2001 | Wen |
| 6,303,215 B1 | 10/2001 | Sonobe et al. |
| 6,354,700 B1 | 3/2002 | Roth |
| 6,363,234 B2 | 3/2002 | Landa et al. |
| 6,364,451 B1 | 4/2002 | Silverbrook |
| 6,386,697 B1 | 5/2002 | Yamamoto et al. |
| 6,390,617 B1 | 5/2002 | Iwao |
| 6,400,913 B1 | 6/2002 | De Jong et al. |
| 6,402,317 B2 | 6/2002 | Yanagawa et al. |
| 6,409,331 B1 | 6/2002 | Gelbart |
| 6,438,352 B1 | 8/2002 | Landa et al. |
| 6,454,378 B1 | 9/2002 | Silverbrook et al. |
| 6,530,657 B2 | 3/2003 | Polierer |
| 6,559,969 B1 | 5/2003 | Lapstun |
| 6,575,547 B2 | 6/2003 | Sakuma |
| 6,608,979 B1 | 8/2003 | Landa et al. |
| 6,639,527 B2 | 10/2003 | Johnson |
| 6,648,468 B2 | 11/2003 | Shinkoda et al. |
| 6,678,068 B1 | 1/2004 | Richter et al. |
| 6,682,189 B2 | 1/2004 | May et al. |
| 6,704,535 B2 | 3/2004 | Kobayashi et al. |
| 6,719,423 B2 | 4/2004 | Chowdry et al. |
| 6,755,519 B2 | 6/2004 | Gelbart et al. |
| 6,761,446 B2 | 7/2004 | Chowdry et al. |
| 6,789,887 B2 | 9/2004 | Yang et al. |
| 6,827,018 B1 | 12/2004 | Hartmann et al. |
| 6,898,403 B2 | 5/2005 | Baker et al. |
| 6,912,952 B1 | 7/2005 | Landa et al. |
| 6,917,437 B1 | 7/2005 | Myers et al. |
| 6,970,674 B2 | 11/2005 | Sato et al. |
| 6,974,022 B2 | 12/2005 | Saeki |
| 6,982,799 B2 | 1/2006 | Lapstun |
| 7,057,760 B2 | 6/2006 | Lapstun et al. |
| 7,204,584 B2 | 4/2007 | Lean et al. |
| 7,224,478 B1 | 5/2007 | Lapstun et al. |
| 7,265,819 B2 | 9/2007 | Raney |
| 7,296,882 B2 | 11/2007 | Buehler et al. |
| 7,300,133 B1 | 11/2007 | Folkins et al. |
| 7,300,147 B2 | 11/2007 | Johnson |
| 7,304,753 B1 | 12/2007 | Richter et al. |
| 7,322,689 B2 | 1/2008 | Kohne et al. |
| 7,334,520 B2 | 2/2008 | Geissler et al. |
| 7,360,887 B2 | 4/2008 | Konno |
| 7,362,464 B2 | 4/2008 | Kitazawa |
| 7,459,491 B2 | 12/2008 | Tyvoll et al. |
| 7,527,359 B2 | 5/2009 | Stevenson et al. |
| 7,708,371 B2 | 5/2010 | Yamanobe |
| 7,712,890 B2 | 5/2010 | Yahiro |
| 7,808,670 B2 | 10/2010 | Lapstun et al. |
| 7,810,922 B2 | 10/2010 | Gervasi et al. |
| 7,845,788 B2 | 12/2010 | Oku |
| 8,025,389 B2 | 9/2011 | Yamanobe et al. |
| 8,042,906 B2 | 10/2011 | Chiwata et al. |
| 8,059,309 B2 | 11/2011 | Lapstun et al. |
| 8,109,595 B2 | 2/2012 | Tanaka et al. |
| 8,122,846 B2 | 2/2012 | Stiblert et al. |
| 8,147,055 B2 | 4/2012 | Cellura et al. |
| 8,256,857 B2 | 9/2012 | Folkins et al. |
| 8,264,135 B2 | 9/2012 | Ozolins et al. |
| 8,295,733 B2 | 10/2012 | Imoto |
| 8,303,072 B2 | 11/2012 | Shibata et al. |
| 8,434,847 B2 | 5/2013 | Dejong et al. |
| 8,693,032 B2 | 4/2014 | Goddard et al. |
| 8,711,304 B2 | 4/2014 | Mathew et al. |
| 8,746,873 B2 | 6/2014 | Tsukamoto et al. |
| 8,894,198 B2 | 11/2014 | Hook et al. |
| 8,919,946 B2 | 12/2014 | Suzuki et al. |
| 9,004,629 B2 | 4/2015 | De Jong et al. |
| 9,186,884 B2 | 11/2015 | Landa et al. |
| 9,229,664 B2 | 1/2016 | Landa et al. |
| 9,498,946 B2 | 11/2016 | Landa et al. |
| 9,884,479 B2 | 2/2018 | Landa et al. |
| 10,065,411 B2 | 9/2018 | Landa et al. |
| 2001/0022607 A1 | 9/2001 | Takahashi et al. |
| 2003/0118381 A1 | 6/2003 | Law et al. |
| 2003/0214568 A1 | 11/2003 | Nishikawa et al. |
| 2003/0234849 A1 | 12/2003 | Pan et al. |
| 2004/0173111 A1 | 9/2004 | Okuda |
| 2004/0228642 A1 | 11/2004 | Iida et al. |
| 2005/0082146 A1 | 4/2005 | Axmann |
| 2005/0110855 A1 | 5/2005 | Taniuchi et al. |
| 2005/0134874 A1 | 6/2005 | Overall et al. |
| 2005/0150408 A1 | 7/2005 | Hesterman |
| 2006/0164488 A1 | 7/2006 | Taniuchi et al. |
| 2006/0286462 A1 | 12/2006 | Jackson et al. |
| 2007/0014595 A1 | 1/2007 | Kawagoe |
| 2007/0025768 A1 | 2/2007 | Komatsu et al. |
| 2007/0134030 A1 | 6/2007 | Lior et al. |
| 2007/0144368 A1 | 6/2007 | Barazani et al. |
| 2007/0146462 A1 | 6/2007 | Taniuchi et al. |
| 2007/0166071 A1 | 7/2007 | Shima |
| 2007/0176995 A1 | 8/2007 | Kadomatsu et al. |
| 2007/0199457 A1 | 8/2007 | Cyman, Jr. et al. |
| 2007/0229639 A1 | 10/2007 | Yahiro |
| 2007/0285486 A1 | 12/2007 | Harris et al. |
| 2008/0006176 A1 | 1/2008 | Houjou |
| 2008/0030536 A1 | 2/2008 | Furukawa et al. |
| 2008/0032072 A1 | 2/2008 | Taniuchi et al. |
| 2008/0055381 A1 | 3/2008 | Doi et al. |
| 2008/0055385 A1 | 3/2008 | Houjou |
| 2008/0074462 A1 | 3/2008 | Hirakawa |
| 2008/0166495 A1 | 7/2008 | Maeno et al. |
| 2008/0175612 A1 | 7/2008 | Oikawa et al. |
| 2008/0196612 A1 | 8/2008 | Rancourt et al. |
| 2008/0196621 A1 | 8/2008 | Ikuno et al. |
| 2008/0236480 A1 | 10/2008 | Furukawa et al. |
| 2008/0253812 A1 | 10/2008 | Pearce et al. |
| 2009/0022504 A1 | 1/2009 | Kuwabara et al. |
| 2009/0165937 A1 | 7/2009 | Inoue et al. |
| 2009/0190951 A1 | 7/2009 | Torimaru et al. |
| 2009/0202275 A1 | 8/2009 | Nishida et al. |
| 2009/0211490 A1 | 8/2009 | Ikuno et al. |
| 2009/0317555 A1 | 12/2009 | Hori |
| 2010/0066796 A1 | 3/2010 | Yanagi et al. |
| 2010/0075843 A1 | 3/2010 | Ikuno et al. |
| 2010/0091064 A1 | 4/2010 | Araki et al. |
| 2010/0303504 A1 | 12/2010 | Funamoto et al. |
| 2010/0310281 A1 | 12/2010 | Miura et al. |

(56) References Cited

U.S. PATENT DOCUMENTS

| | | | |
|---|---|---|---|
| 2011/0058001 A1 | 3/2011 | Gila et al. | |
| 2011/0085828 A1 | 4/2011 | Kosako et al. | |
| 2011/0128300 A1* | 6/2011 | Gay | G06T 19/006 345/633 |
| 2011/0141188 A1 | 6/2011 | Morita | |
| 2011/0234683 A1 | 9/2011 | Komatsu | |
| 2011/0234689 A1 | 9/2011 | Saito | |
| 2011/0249090 A1* | 10/2011 | Moore | G06T 19/00 348/43 |
| 2011/0269885 A1 | 11/2011 | Imai | |
| 2012/0013928 A1 | 1/2012 | Yoshida et al. | |
| 2012/0026224 A1 | 2/2012 | Anthony et al. | |
| 2012/0039647 A1 | 2/2012 | Brewington et al. | |
| 2012/0105525 A1 | 5/2012 | Leung et al. | |
| 2012/0105561 A1 | 5/2012 | Taniuchi et al. | |
| 2012/0113203 A1 | 5/2012 | Kushida et al. | |
| 2012/0127250 A1 | 5/2012 | Kanasugi et al. | |
| 2012/0140009 A1 | 6/2012 | Kanasugi et al. | |
| 2012/0163846 A1 | 6/2012 | Andoh et al. | |
| 2012/0194830 A1 | 8/2012 | Gaertner et al. | |
| 2012/0237260 A1 | 9/2012 | Sengoku et al. | |
| 2012/0301186 A1 | 11/2012 | Yang et al. | |
| 2012/0314077 A1 | 12/2012 | Clavenna, II et al. | |
| 2013/0044188 A1* | 2/2013 | Nakamura | H04N 13/0022 348/46 |
| 2013/0057603 A1 | 3/2013 | Gordon | |
| 2013/0120513 A1 | 5/2013 | Thayer et al. | |
| 2013/0201237 A1 | 8/2013 | Thomson et al. | |
| 2014/0001013 A1 | 1/2014 | Takifuji et al. | |
| 2014/0267777 A1 | 9/2014 | Le et al. | |
| 2015/0022602 A1 | 1/2015 | Landa et al. | |
| 2015/0024648 A1 | 1/2015 | Landa et al. | |
| 2015/0049134 A1 | 2/2015 | Shmaiser et al. | |
| 2015/0195509 A1 | 7/2015 | Phipps | |
| 2015/0304531 A1 | 10/2015 | Rodriguez et al. | |
| 2016/0286462 A1 | 9/2016 | Gohite et al. | |
| 2018/0093470 A1 | 4/2018 | Landa et al. | |

FOREIGN PATENT DOCUMENTS

| | | | |
|---|---|---|---|
| GB | 748821 A | 5/1956 | |
| GB | 1496016 A | 12/1977 | |
| GB | 1522175 A | 8/1978 | |
| JP | H05297737 A | 11/1993 | |
| JP | 2000108320 A | 4/2000 | |
| JP | 2002169383 A | 6/2002 | |
| JP | 2002326733 A | 11/2002 | |
| JP | 2003114558 A | 4/2003 | |
| JP | 2003211770 A | 7/2003 | |
| JP | 2003219271 A | 7/2003 | |
| JP | 2004077669 A | 3/2004 | |
| JP | 2004114377 A | 4/2004 | |
| JP | 2004114675 A | 4/2004 | |
| JP | 2005014255 A | 1/2005 | |
| JP | 2005114769 A | 4/2005 | |
| JP | 2006001688 A | 1/2006 | |
| JP | 2006102975 A | 4/2006 | |
| JP | 2006137127 A | 6/2006 | |
| JP | 2006243212 A | 9/2006 | |
| JP | 2006347081 A | 12/2006 | |
| JP | 2007069584 A | 3/2007 | |
| JP | 2007216673 A | 8/2007 | |
| JP | 2008039698 A | 2/2008 | |
| JP | 2008142962 A | 6/2008 | |
| JP | 2008255135 A | 10/2008 | |
| JP | 2009045794 A | 3/2009 | |
| JP | 2009083317 A | 4/2009 | |
| JP | 2009083325 A | 4/2009 | |
| JP | 2009154330 A | 7/2009 | |
| JP | 2009190375 A | 8/2009 | |
| JP | 2009202355 A | 9/2009 | |
| JP | 2009214318 A | 9/2009 | |
| JP | 2009226852 A | 10/2009 | |
| JP | 2009233977 A | 10/2009 | |
| JP | 2009234219 A | 10/2009 | |
| JP | 2010054855 A | 3/2010 | |
| JP | 2010105365 A | 5/2010 | |
| JP | 2010173201 A | 8/2010 | |
| JP | 2010241073 A | 10/2010 | |
| JP | 2011002532 A | 1/2011 | |
| JP | 2011025431 A | 2/2011 | |
| JP | 2011133884 A | 7/2011 | |
| JP | 2011173325 A | 9/2011 | |
| JP | 2011173326 A | 9/2011 | |
| JP | 2012086499 A | 5/2012 | |
| JP | 2012111194 A | 6/2012 | |
| WO | WO-9307000 A1 | 4/1993 | |
| WO | WO-9943502 A2 | 9/1999 | |
| WO | WO-2013087249 A1 | 6/2013 | |
| WO | WO-2013132418 A2 | 9/2013 | |
| WO | WO-2013132420 A1 | 9/2013 | |
| WO | WO-2013132432 A1 | 9/2013 | |
| WO | WO-2013136220 A1 | 9/2013 | |

OTHER PUBLICATIONS

Marconi Studios, Virtual SET Real Time; http://www.marconistudios.it/pages/virtualset_en.php.

Royal Television Society, The Flight of the Phoenix; https://rts.org.uk/article/flight-phoenix, Jan. 27, 2011.

CN 104618642 Machine Translation (by EPO and Google); published on May 13, 2015, Yulong Comp Comm Tech Shenzhen.

JP 2003219271 Machine Translation (by EPO and Google); published on Jul. 31, 2003, Japan Broadcasting Corp.

Co-pending U.S. Appl. No. 16/047,033, filed Jul. 27, 2018.

DE102010060999 Machine Translation (by EPO and Google)—published Jun. 6, 2012; Wolf, Roland, Dr.-Ing.

JP2000108320 Machine Translation (by PlatPat English machine translation)—published Apr. 18, 2000 Brother Ind. Ltd.

JP2002-169383 Machine Translation (by EPO, PlatPat and Google)—published Jun. 14, 2002 Richo KK.

JP2002-326733 Machine Translation (by EPO, PlatPat and Google)—published Nov. 12, 2002; Kyocera Mita Corp.

JP2003-114558 Machine Translation (by EPO, PlatPat and Google)—published Apr. 18, 2003 Mitsubishi Chem Corp, Yuka Denshi Co Ltd, et al.

JP2003-211770 Machine Translation (by EPO and Google)—published Jul. 29, 2003 Hitachi Printing Solutions.

JP2004077669 Machine Translation (by PlatPat English machine translation)—published Mar. 11, 2004 Fuji Xerox Co Ltd.

JP2004114377(A) Machine Translation (by EPO and Google)—published Apr. 15, 2004; Konica Minolta Holdings Inc, et al.

JP2004114675 Machine Translation (by EPO and Google)—published Apr. 15, 2004; Canon Inc.

JP2005014255 Machine Translation (by EPO and Google)—published Jan. 20, 2005; Canon Inc.

JP2005114769 Machine Translation (by PlatPat English machine translation)—published Apr. 28, 2005 Ricoh KK.

JP2006001688 Machine Translation (by PlatPat English machine translation)—published Jan. 5, 2006 Ricoh KK.

JP2006-102975 Machine Translation (by EPO and Google)—published Apr. 20, 2006; Fuji Photo Film Co Ltd.

JP2006-137127 Machine Translation (by EPO and Google)—published Jun. 1, 2006; Konica Minolta Med & Graphic.

JP2006243212 Machine Translation (by PlatPat English machine translation)—published Sep. 14, 2006 Fuji Xerox Co Ltd.

JP2006-347081 Machine Translation (by EPO and Google)—published Dec. 28, 2006; Fuji Xerox Co Ltd.

JP2007-069584 Machine Translation (by EPO and Google)—published Mar. 22, 2007 Fujifilm.

JP2007-216673 Machine Translation (by EPO and Google)—published Aug. 30, 2007 Brother Ind.

JP2008-142962 Machine Translation (by EPO and Google)—published Jun. 26, 2008; Fuji Xerox Co Ltd.

JP2008-255135 Machine Translation (by EPO and Google)—published Oct. 23, 2008; Fujifilm Corp.

JP2009-045794 Machine Translation (by EPO and Google)—published Mar. 5, 2009; Fujifilm Corp.

(56) References Cited

OTHER PUBLICATIONS

JP2009-083317 Abstract; Machine Translation (by EPO and Google)—published Apr. 23, 2009; Fuji Film Corp.
JP2009-083325 Abstract; Machine Translation (by EPO and Google)—published Apr. 23, 2009 Fujifilm.
JP2009-154330 Machine Translation (by EPO and Google)—published Jul. 16, 2009; Seiko Epson Corp.
JP2009-190375 Machine Translation (by EPO and Google)—published Aug. 27, 2009; Fuji Xerox Co Ltd.
JP2009-202355 Machine Translation (by EPO and Google)—published Sep. 10, 2009; Fuji Xerox Co Ltd.
JP2009-214318 Machine Translation (by EPO and Google)—published Sep. 24, 2009 Fuji Xerox Co Ltd.
JP2009-226852 Machine Translation (by EPO and Google)—published Oct. 8, 2009; Hirato Katsuyuki, Fujifilm Corp.
JP2009-233977 Machine Translation (by EPO and Google)—published Oct. 15, 2009; Fuji Xerox Co Ltd.
JP2009-234219 Machine Translation (by EPO and Google)—published Oct. 15, 2009; Fujifilm Corp.
JP2010-054855 Machine Translation (by PlatPat English machine translation)—published Mar. 11, 2010 Itatsu, Fuji Xerox Co.
JP2010-105365 Machine Translation (by EPO and Google)—published May 13, 2010; Fuji Xerox Co Ltd.
JP2010-173201 Abstract; Machine Translation (by EPO and Google)—published Aug. 12, 2010; Richo Co Ltd.
JP2010-241073 Machine Translation (by EPO and Google)—published Oct. 28, 2010; Canon Inc.
JP2011002532 Machine Translation (by PlatPat English machine translation)—published Jun. 1, 2011 Seiko Epson Corp.
JP2011-025431 Machine Translation (by EPO and Google)—published Feb. 10, 2011; Fuji Xerox Co Ltd.
JP2011-173325 Abstract; Machine Translation (by EPO and Google)—published Sep. 8, 2011; Canon Inc.
JP2011-173326 Machine Translation (by EPO and Google)—published Sep. 8, 2011; Canon Inc.
JP2012-086499 Machine Translation (by EPO and Google)—published May 10, 2012; Canon Inc.
JP2012-111194 Machine Translation (by EPO and Google)—published Jun. 14, 2012; Konica Minolta.
JPH5-297737 Machine Translation (by EPO & Google machine translation)—published Nov. 12, 1993 Fuji Xerox Co Ltd.
JP2008039698 Machine Translation (by EPO and Google)—published Feb. 21, 2008, Univ Nagoya.
WO2013/087249 Machine Translation (by EPO and Google)—published Jun. 20, 2013; Koenig & Bauer AG.

* cited by examiner

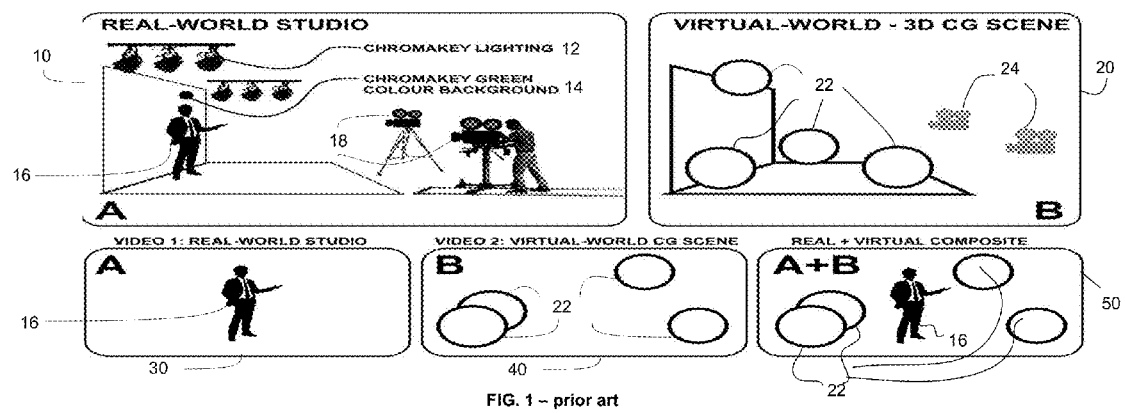
FIG. 1 - prior art
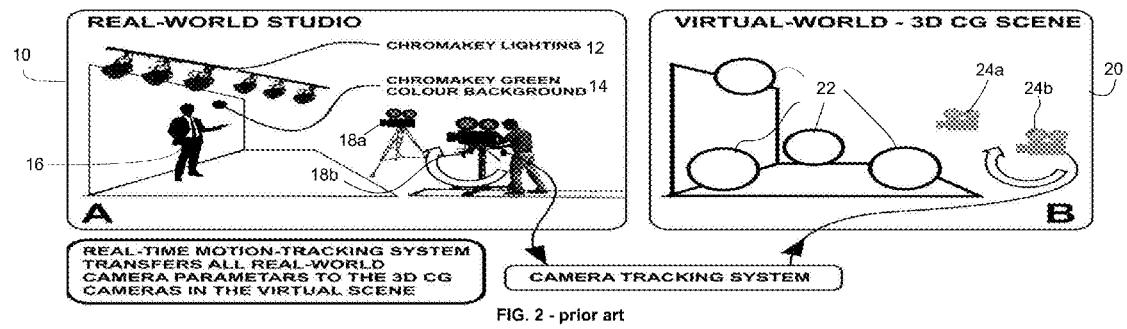
FIG. 2 - prior art

600

610 — receive instructions for performing a real-world movements group for moving the source image acquisition device, the source image acquisition device being capable of capturing a source video feed from a video feed POV, the real-world movement group being substantially identical to movements made by a master image acquisition device capturing a master 3D scene for changing a scene POV of the master 3D scene 620 — perform the real-world movements group for changing the object POV of the object by the image acquisition device so that the object POV is substantially identical to the scene POV

FIG. 16

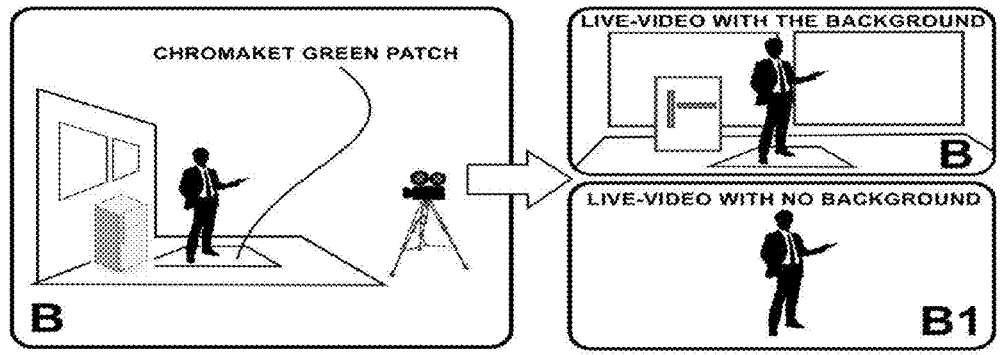

FIG. 17

SYSTEM AND METHOD FOR GENERATING VIDEOS

TECHNICAL FIELD

The presently disclosed subject matter relates to systems, methods, and computer program products for inserting a source video feed into a master Three-Dimensional (3D) scene and generating a combined video, optionally in real-time.

BACKGROUND

Current technologies for combining videos usually suffer from various problems or disadvantages. One such technology is known as "Virtual Studio Technology". In a "Virtual Studio Technology" a real-world television studio allows combining a first video of real-world environments and/or real-world objects, with a second, computer generated, video of a virtual scene including virtual objects, in a seamless manner and optionally in real-time, thereby generating a third, combined, video. The first video is captured by real-world video cameras, whereas the second video can be regarded as being captured (or rendered) by "virtual cameras". A virtual camera can be defined by a virtual position (e.g. with respect to a certain object or point in the virtual scene), a virtual orientation (e.g. with respect to a certain object or point/s in the virtual scene) and a virtual viewing angle (the angle of view that the virtual camera encompasses/sees). The virtual position, and virtual orientation define a Point-of-View (POV) the virtual camera has of the scene and the virtual viewing angle defines the frames (being for example the still images which compose the video) that the virtual camera sees or acquires.

It is to be noted however that in Virtual Studio Technology, the real-world camera can move in a fixed space (determined for example by the real-world studio's height, width and length, and/or by the movements the real-world camera can perform), while the scene captured by the virtual camera is being rendered in real-time from the same POV of the real-world camera. Therefore, the virtual camera has to adopt, at any given time, the real-world camera's settings (zoom, pan, angle, traveling, etc.). In other words, in Virtual Studio Technology, the real-world cameras in the real-world studio are the "master" cameras, and the virtual cameras, rendering the virtual scene, are "slave" cameras that are required to follow the real-world camera movements. Therefore, any content generated by the Virtual Studio Technology (i.e. the video generated by compositing (1) the video captured by the real-world camera in the real-world studio and (2) the Three-Dimensional (3D) Computer Generated (CG) video virtually rendered by the virtual camera) will always be physically constrained to what the real-world cameras can physically do in the limited and confined real-world studio environment. For example, if the real-world studio would be only ten square meters wide—both real-world camera movement and the virtual camera that "follows" it would be constrained to those limited scales.

In addition, recording sessions with Virtual Studio Technology usually require relatively large real-world studio, filled with lights, large areas of perfectly-even-lit green-screen material, and expensive equipment enabling dramatic camera movements across large distances and spaces. Such cinematic devices include electrical dollies, cranes, dolly & crane combinations, jib-camera-arms, camera-booms, etc. Additionally it requires tracking each real-world camera in the real-world studio, and mapping its position and orientation (and optionally also its variable focal length lens position (zoom)) onto the corresponding virtual camera, so that the point of view of the virtual cameras viewing the virtual CG scene and/or objects inside the virtual scene will be synchronized with the point of view of the real-world cameras capturing the real-world scene and/or real-world objects inside the real-world scene. Once synchronisation between the points of view of each real-world camera and its corresponding virtual camera is established, visual mixing of the result can be achieved, e.g. utilizing known green-screen chroma-keying techniques.

However, due to the required cinematic camera-moving devices, motorized camera controls, and expensive camera-tracking systems, conventional Virtual Studio Technologies are usually expensive and involve very intense preparations, calibrations (for achieving identical spatio-optical renderings of space as seen by all real-world cameras in the real-world studio and the corresponding virtual cameras rendering the virtual scene), and set-up times before working configuration is ready for an actual shooting/recording session.

Furthermore, in order to be able to successfully perform electronic/video replacement of chroma-key green surface with CG visuals—a special kind of lighting may be required. To ensure an equal level of green color across the entire green surface placed in the background of the real-world studio the lighting conditions needs to assure that there are no segments of the green surface too dark, and no segments too bright. Large flood-lights carrying special light-diffusers are therefore positioned and distributed evenly across the ceiling of the studio to provide near-perfect light conditions for green color to remain even across the chroma-key green surface that usually covers large portions of the real-world studio.

As a resulting sum of all these complex processes to assure full functionality of Virtual Studio Technology—use of conventional real-time Virtual Studio Technology is currently relatively limited in scope and proven to be expensive. Due to the prices of studio-recordings per day, and due to the fact that set-up process is relatively tedious and both technologically and logistically complex, real-time Virtual Studio Technology found only limited use in commercial television applications, like niche uses for election days, sports events, and other television events with relatively high television commercial value—events and broadcasts that will justify the use of expensive real-time Virtual Studio Technology equipment and process.

With exception of rare and expensive television prime-time uses, due to the prohibitive costs of large studio, large chromakey green/blue backdrops, calibration process, setup process, large lighting requirements, sophisticated devices for camera transport, complex system for camera tracking, and highly-skilled personnel—in both production and creative terms—real-time Virtual Studio Technologies failed to this point to become mainstream production solution for any kind of video content.

US Patent Application No. 2012/0314077 (Clavenna I I et al.) published on Dec. 13, 2012 discloses a network device that receives, from a first video camera system, position information for a first video camera at a first site and sends, to a second video camera system, position instructions for a second video camera at a second site. The position instructions are configured to locate the second video camera within the second site to correspond to a relative position of the first camera in the first site. The network device receives, from the first video camera system, a first video feed including images of the first site and receives, from the second video camera system, a second video feed including images of a subject of the second site. The network device combines the first video feed and the second video feed to generate a synchronized combined video feed that overlays the images of the subject of the second video feed in images of the first site.

US Patent Application No. 2011/0128300 (Gay et al.), published on Jun. 2, 2011, discloses a system and method for integrating a virtual rendering system and a video capture system using flexible camera control to provide an augmented reality. There is provided a method comprising receiving input data from a plurality of clients for modifying a virtual environment presented using the virtual rendering system, obtaining, from the virtual rendering system, a virtual camera configuration of a virtual camera in the virtual environment, programming the video capture system using the virtual camera configuration to correspondingly control a robotic camera in a real environment, capturing a video capture feed using the robotic camera, obtaining a virtually rendered feed using the virtual camera showing the modifying of the virtual environment, rendering the composite render by processing the feeds, and outputting the composite render to the display.

US Patent Application No. 2015/0304531 (Rodrigues Garcia et al.) published on Oct. 22, 2015 discloses a method, the method comprises capturing by at least a camera an image of a physical object against a background; extracting a silhouette of said physical object from the captured image and mapping it over a three-dimensional geometry; incorporating said virtual object as one more element in the virtual scene; and orienting said virtual object with regard to the virtual camera. Embodiments of the method further comprises obtaining and using intrinsic and/or extrinsic parameters of said physical camera and said captured image to calculate said physical object position; projecting back said captured image over the three dimensional geometry using said intrinsic and/or extrinsic parameters; and placing the virtual object in the virtual scene and selecting an axis of rotation to orient the virtual object with regard to the virtual camera based on said calculated position of the physical object.

US Patent Application No. 2015/195509 (Herman) published on Jul. 9, 2015 discloses a method for incorporating two dimensional images such as those captured by a video camera, which is moving and whose optics, particularly zoom and focus, are controlled by a human or by automatic means, into a virtual three dimensional coordinate system is provided In one embodiment the method acquires calibration data over the functional range of the studio camera optics, and then in operation dynamically performs the appropriate transformations needed to map the video stream to the virtual coordinate system, even as the acquiring studio camera moves, zooms, and changes focus.

US Patent Application No. 2014/267777 (Francois et al.) published on Sep. 18, 2014 discloses a method for shooting a performance making use of unmanned aerial vehicles, such drones for example, to provide the physical markers that are needed to give a physical actor indications on the positioning of virtual elements to be inserted later in the scene, and with which s/he needs to interact.

China Patent Application No. CN 104618642 (Nining) published on May 13, 2015 discloses a terminal photographing control method. The terminal comprises at least one main camera for photographing. The method comprises the steps of presetting a movable virtual camera; building a mapping relation between the main camera and the virtual camera; calculating and processing an image acquired by the main camera by the terminal according to the mapping relation during photographing through the main camera. The invention further provides a photographing terminal for implementing the method above. According to the method and the photographing terminal, the touch function of the photographing terminal can be utilized to adjust the photographing position, and thus the user experience can be increased.

Japan Patent Application No. JP 2003219271 (Yamauchi Yuiko et al.) published on Jul. 31, 2003 discloses: PROBLEM TO BE SOLVED: To provide a multipoint virtual studio synthesizing system for synthesizing videos from a plurality of cameras in real time without causing an uncomfortable feeling based on videos and depth information obtained by using the plurality of cameras; SOLUTION: This multipoint virtual studio synthesizing system is provided with robot cameras arranged at a plurality of places and for acquiring image data of objects and depth information of the image data, means and for controlling camera parameters including robot camera panning, tilting, zooming and focus in real time, means for generating a key signal of each of the objects for synthesizing images on the basis of the depth information obtained in each of the robot cameras, an electronic plotting means for generating electronic videos and depth information of the electronic videos to be used in image synthesis, and a means for extracting image parts to be synthesized on the basis of the key signals of the objects and synthesizing the images.

SUMMARY

Throughout this specification, the following definitions are employed:

Scene: everything captured by an image acquisition device (e.g. a real-world or a virtual video camera) in a video, or in a single shot (a sequence of images, or frames, captured during an uninterrupted period of time, since the image acquisition device starts capturing the images until it stops) comprised within the video.

Scene POV: an image acquisition device's POV of a scene.

Object POV: an image acquisition device's POV of an object.

Video Feed POV: an image acquisition device's POV of at least one real-world object within a scene.

Scene POV changes: changes of an image acquisition device's POV of a scene.

Video Feed POV changes: a change of an image acquisition device's POV of at least one real-world object within a scene.

In accordance with a first aspect of the presently disclosed subject matter there is provided a system comprising a processor configured to: provide a master Three-Dimensional (3D) scene; insert at least one source video feed into at least one position within the master 3D scene, allowing a configuration in which at least a first part of the master 3D scene is in front of the source video feed and at least a second part of the master 3D scene is behind the source video feed; and generate a combined video of the master 3D scene with the at least one source video feed inserted therein.

In some cases, the processor is further configured to: obtain information indicative of one or more scene Point of View (POV) changes being changes of a master image acquisition device's POV of the master 3D scene; automatically determine, based on the obtained information, for each of the scene POV changes, corresponding real-world movements groups of a source image acquisition device configured for capturing the source video feed; and provide instructions to perform the real-world movements groups, wherein performing each of the real-world movements groups results in a video feed POV change; wherein: (a) each of the scene POV changes results in a corresponding scene POV being the master image acquisition device's POV of the master 3D scene; (b) each video feed POV change being a change of the source image acquisition device's POV, that is substantially identical to the scene POV change, and each video feed POV change defines a corresponding video feed POV, being the source image acquisition device's POV of at least one real-world object; and (c) the instructions are provided for maintaining synchronicity between the scene POV and the video feed POV while generating the combined video.

In some cases, the information indicative of one or more scene POV changes is obtained before the scene POV changes are made.

In some cases, a scale of the inserted source video feed is substantially constant and wherein a distance of the source image acquisition device from the at least one real-world object is substantially constant, independent of the distance of the master image acquisition device from the inserted source video feed.

In some cases, the processor is further configured to rotate the inserted source video feed upon movement of the master image acquisition device so that the inserted source video feed continuously faces the master image acquisition device.

In some cases, the at least one source video feed is inserted into at least two different positions within the master 3D scene.

In some cases, the processor is configured to insert at least two different source video feeds, each into at least one distinct position within the master 3D scene, and wherein the combined video includes the at least two different source video feeds.

In some cases, the source image acquisition device is mounted on a movable device configured to perform the real-world movements group.

In some cases, the movable device is a flying drone.

In some cases, the processor is further configured to obtain points-in-time corresponding to each of the scene POV changes, and wherein the instructions to perform each of the real-world movements groups are provided at each of said points-in-time during acquisition of the source video feed, enabling thereby the source image acquisition device to timely perform the corresponding real-world movements group while maintaining synchronicity between the scene POVs and the video feed POVs.

In some cases, the source video feed is provided in real-time and the combined video is generated in real-time.

In some cases, during at least a first time-window of the combined video the source video feed is at least partially occluded by at least one first object of the master 3D scene and during at least a second time-window of the combined video the source video feed at least partially occludes at least one second object of the master 3D scene.

In some cases, the first time-window and the second time-window at least partially overlap.

In some cases, the first object and the second object are the same object.

In some cases, the source video feed includes a cut-out of a real-world object, the cut-out being automatically extracted from a video captured by the source image acquisition device.

In some cases, the real-world object is a person.

In some cases, the source image acquisition device is a real-world video camera and wherein the source video feed is a real-world video feed.

In some cases, the source video feed includes at least one virtual object.

In some cases, the master image acquisition device is a virtual video camera, the master 3D scene is a virtual 3D scene created using computer graphics, and each of the scene POVs is a corresponding virtual video camera's POV of the virtual 3D scene.

In some cases, the master 3D scene includes at least one real-world object.

In some cases, the master image acquisition device is a real-world video camera, the master 3D scene is a real-world scene of a real-world 3D movie and each of the scene POVs is a corresponding real-world video camera's POV of the master 3D scene.

In some cases, the master 3D scene includes at least one virtual object.

In some cases, the source video feed is displayed or not displayed in the combined video in accordance with at least one pre-determined rule.

In some cases, the pre-determined rule depends on one or more of the following: (a) a distance of the master image acquisition device capturing the master 3D scene from the corresponding position of the source video feed within the master 3D scene; (b) an angle between the master image acquisition device capturing the master 3D scene and the corresponding position of the source video feed within the master 3D scene.

In some cases, the insert comprises inserting a first source video feed and a second source video feed, each into a different position within the master 3D scene and wherein during at least a first time-window of the combined video the first source video feed is at least partially occluded by the second source video feed, and during at least a second time-window of the combined video the second source video feed is at least partially occluded by the first source video feed.

In some cases, the source video feed is a two-dimensional video feed.

In some cases, the source video feed is a three-dimensional video feed.

In some cases, the master 3D scene includes a real or virtual representation of at least part of a printing system.

In accordance with a second aspect of the presently disclosed subject matter there is provided a method comprising: providing a master Three-Dimensional (3D) scene; inserting, by a processor, at least one source video feed into at least one position within the master 3D scene, allowing a configuration in which at least a first part of the master 3D scene is in front of the source video feed and at least a second part of the master 3D scene is behind the source video feed; and generating, by the processor, a combined video of the master 3D scene with the at least one source video feed inserted therein.

In some cases, the method further comprises: obtaining information indicative of one or more scene Point of View (POV) changes being changes of a master image acquisition device's POV of the master 3D scene; automatically determining, by the processor and based on the obtained information, for each of the scene POV changes, corresponding real-world movements groups of a source image acquisition device configured for capturing the source video feed; and providing instructions to perform the real-world movements groups, wherein performing each of the real-world movements groups results in a video feed POV change; wherein:

(a) each of the scene POV changes results in a corresponding scene POV being the master image acquisition device's POV of the master 3D scene; (b) each video feed POV change being a change of the source image acquisition device's POV, that is substantially identical to the scene POV change, and each video feed POV change defines a corresponding video feed POV, being the source image acquisition device's POV of at least one real-world object; and (c) the instructions are provided for maintaining synchronicity between the scene POV and the video feed POV while generating the combined video.

In some cases, the information indicative of one or more scene POV changes is obtained before the scene POV changes are made.

In some cases, a scale of the inserted source video feed is substantially constant and wherein a distance of the source image acquisition device from the at least one real-world object is substantially constant, independent of the distance of the master image acquisition device from the inserted source video feed.

In some cases, the method further comprises rotating, by the processor, the inserted source video feed upon movement of the master image acquisition device so that the inserted source video feed continuously faces the master image acquisition device.

In some cases, the at least one source video feed is inserted into at least two different positions within the master 3D scene.

In some cases, the method further comprises inserting, by the processor, at least two different source video feeds, each into at least one distinct position within the master 3D scene, and wherein the combined video includes the at least two different source video feeds.

In some cases, the source image acquisition device is mounted on a movable device configured to perform the real-world movements group.

In some cases, the movable device is a flying drone.

In some cases, the method further comprises obtaining points-in-time corresponding to each of the scene POV changes, and wherein the instructions to perform each of the real-world movements groups are provided at each of said points-in-time during acquisition of the source video feed, enabling thereby the source image acquisition device to timely perform the corresponding real-world movements group while maintaining synchronicity between the scene POVs and the video feed POVs.

In some cases, the source video feed is provided in real-time and the combined video is generated in real-time.

In some cases, during at least a first time-window of the combined video the source video feed is at least partially occluded by at least one first object of the master 3D scene and during at least a second time-window of the combined video the source video feed at least partially occludes at least one second object of the master 3D scene.

In some cases, the first time-window and the second time-window at least partially overlap.

In some cases, the first object and the second object are the same object.

In some cases, the source video feed includes a cut-out of a real-world object, the cut-out being automatically extracted from a video captured by the source image acquisition device.

In some cases, the real-world object is a person.

In some cases, the source image acquisition device is a real-world video camera and wherein the source video feed is a real-world video feed.

In some cases, the source video feed includes at least one virtual object.

In some cases, the master image acquisition device is a virtual video camera, the master 3D scene is a virtual 3D scene created using computer graphics, and each of the scene POVs is a corresponding virtual video camera's POV of the virtual 3D scene.

In some cases, the master 3D scene includes at least one real-world object.

In some cases, the master image acquisition device is a real-world video camera, the master 3D scene is a real-world scene of a real-world 3D movie and each of the scene POVs is a corresponding real-world video camera's POV of the master 3D scene.

In some cases, the master 3D scene includes at least one virtual object.

In some cases, the source video feed is displayed or not displayed in the combined video in accordance with at least one pre-determined rule.

In some cases, the pre-determined rule depends on one or more of the following: (a) a distance of the master image acquisition device capturing the master 3D scene from the corresponding position of the source video feed within the master 3D scene; (b) an angle between the master image acquisition device capturing the master 3D scene and the corresponding position of the source video feed within the master 3D scene.

In some cases, the inserting comprises inserting a first source video feed and a second source video feed, each into a different position within the master 3D scene and wherein during at least a first time-window of the combined video the first source video feed is at least partially occluded by the second source video feed, and during at least a second time-window of the combined video the second source video feed is at least partially occluded by the first source video feed.

In some cases, the source video feed is a two-dimensional video feed.

In some cases, the source video feed is a three-dimensional video feed.

In some cases, the master 3D scene includes a real or virtual representation of at least part of a printing system.

In accordance with a third aspect of the presently disclosed subject matter there is provided a non-transitory computer readable storage medium having computer readable program code embodied therewith, the computer readable program code, executable by at least one processor of a computer to perform a method comprising: providing a master Three-Dimensional (3D) scene; inserting, by a processor, at least one source video feed into at least one position within the master 3D scene, allowing a configuration in which at least a first part of the master 3D scene is in front of the source video feed and at least a second part of the master 3D scene is behind the source video feed; and generating, by the processor, a combined video of the master 3D scene with the at least one source video feed inserted therein.

In accordance with a fourth aspect of the presently disclosed subject matter there is provided a printing system comprising at least one processor and at least one display, the processor being configured to: obtain a combined video of (a) a master 3D scene including a real or virtual representation of at least part of the printing system, and (b) a source video feed of a presenter inserted into at least one position within the master 3D scene so that at least a first part of the master 3D scene is in front of the presenter and at least a second part of the master 3D scene is behind the presenter;

and display the combined video comprising at least a portion of the real or virtual representation of the printing system together with the presenter on the display.

In some cases, the source video feed is inserted into at least two different positions within the master 3D scene.

In some cases, the combined video includes at least two different source video feeds, each inserted into at least one distinct position within the master 3D scene.

In some cases, during at least a first time-window of the combined video the source video feed is at least partially occluded by at least one first object of the master 3D scene and during at least a second time-window of the combined video the source video feed at least partially occludes at least one second object of the master 3D scene.

In some cases, the first time-window and the second time-window at least partially overlap.

In some cases, the first object and the second object are the same object.

In some cases, the source video feed is displayed or not displayed in the combined video in accordance with at least one pre-determined rule.

In some cases, the pre-determined rule depends on one or more of the following:
  a. a distance of a master image acquisition device capturing the master 3D scene from the corresponding position of the source video feed within the master 3D scene;
  b. an angle between the master image acquisition device capturing the master 3D scene and the corresponding position of the source video feed within the master 3D scene.

In accordance with a fifth aspect of the presently disclosed subject matter there is provided a printing system comprising at least one processor and at least one display, the processor being configured to:
  provide a master Three-Dimensional (3D) scene, including a real or virtual representation of at least part of the printing system;
  obtain at least one source video feed of a presenter;
  insert the at least one source video feed into at least one position within the master 3D scene, allowing a configuration in which at least a first part of the master 3D scene is in front of the presenter and at least a second part of the master 3D scene is behind the presenter;
    generate a combined video of the master 3D scene including the inserted source video feed; and display the combined video comprising at least a portion of the real or virtual representation of the digital printing system together with the presenter on the display.

In accordance with a sixth aspect of the presently disclosed subject matter there is provided a virtual demo center (VDC) to be used with a printing system, the VDC comprises a processor configured to:
  provide a master Three-Dimensional (3D) scene, comprising a real or virtual representation of at least part of the printing system;
  insert at least one source video feed of a presenter into at least one position within the master 3D scene, allowing a configuration in which at least a first part of the master 3D scene is in front of the presenter and at least a second part of the master 3D scene is behind the presenter; and
  generate a combined video comprising the master 3D scene including the real or virtual representation of at least part of the printing system and the inserted video feed of the presenter.

In some cases, the processor is further configured to: obtain information indicative of one or more scene Point of View (POV) changes being changes of a master image acquisition device's POV of the master 3D scene; automatically determine, based on the obtained information, for each of the scene POV changes, corresponding real-world movements groups of a source image acquisition device configured for capturing the source video feed; and provide instructions to perform the real-world movements groups, wherein performing each of the real-world movements groups results in a video feed POV change; wherein: (a) each of the scene POV changes results in a corresponding scene POV being the master image acquisition device's POV of the master 3D scene; (b) each video feed POV change being a change of the source image acquisition device's POV, that is substantially identical to the scene POV change, and each video feed POV change defines a corresponding video feed POV, being the source image acquisition device's POV of at least one real-world object; and (c) the instructions are provided for maintaining synchronicity between the scene POV and the video feed POV while generating the combined video.

In some cases, the information indicative of one or more scene POV changes is obtained before the scene POV changes are made.

In some cases, a scale of the inserted source video feed is substantially constant and wherein a distance of the source image acquisition device from the at least one real-world object is substantially constant, independent of the distance of the master image acquisition device from the inserted source video feed.

In some cases, the processor is further configured to rotate the inserted source video feed upon movement of the master image acquisition device so that the inserted source video feed continuously faces the master image acquisition device.

In some cases, the at least one source video feed is inserted into at least two different positions within the master 3D scene.

In some cases, the source image acquisition device is mounted on a movable device configured to perform the real-world movements group.

In some cases, the movable device is a flying drone.

In some cases, the processor is further configured to obtain points-in-time corresponding to each of the scene POV changes, and wherein the instructions to perform each of the real-world movements groups are provided at each of said points-in-time during acquisition of the source video feed, enabling thereby the source image acquisition device to timely perform the corresponding real-world movements group while maintaining synchronicity between the scene POVs and the video feed POVs.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 1 is a schematic illustration of Virtual Studio Technology, in accordance with the prior art;

FIG. 2 is a schematic illustration of the relationship between the real-world camera and the virtual camera in Virtual Studio Technology, in accordance with the prior art;

FIG. 16 is a flowchart illustrating one example of a sequence of operations carried out by a movable device for changing a source image acquisition device POV of source video feed, in accordance with the presently disclosed subject matter;

FIG. 17 is a schematic exemplary illustration of extracting a real-world object from the background using a combination of depth-based keying and chroma-keying techniques, in accordance with the presently disclosed subject matter;

DETAILED DESCRIPTION

Figure 3:
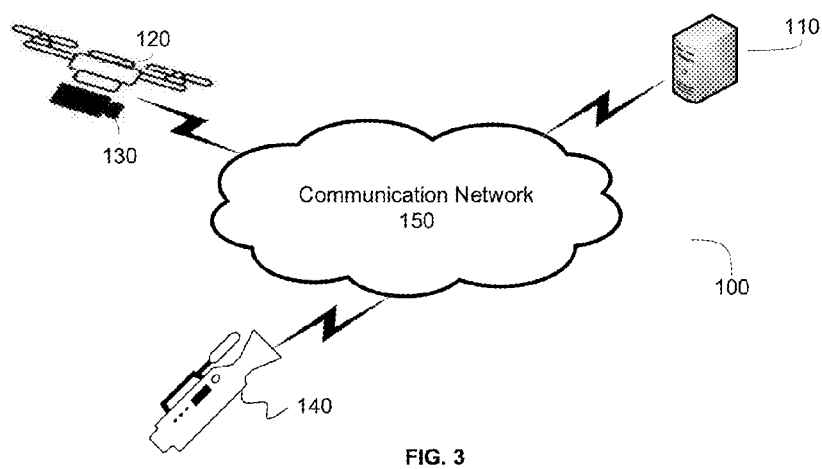
FIG. 3 is a schematic illustration of an exemplary operational concept of a system for inserting a source video feed into a master 3D scene and generating a combined video, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "inserting", "generating", "rotating", "obtaining", "determining", "providing", "superimposing", "receiving", "performing" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 13:
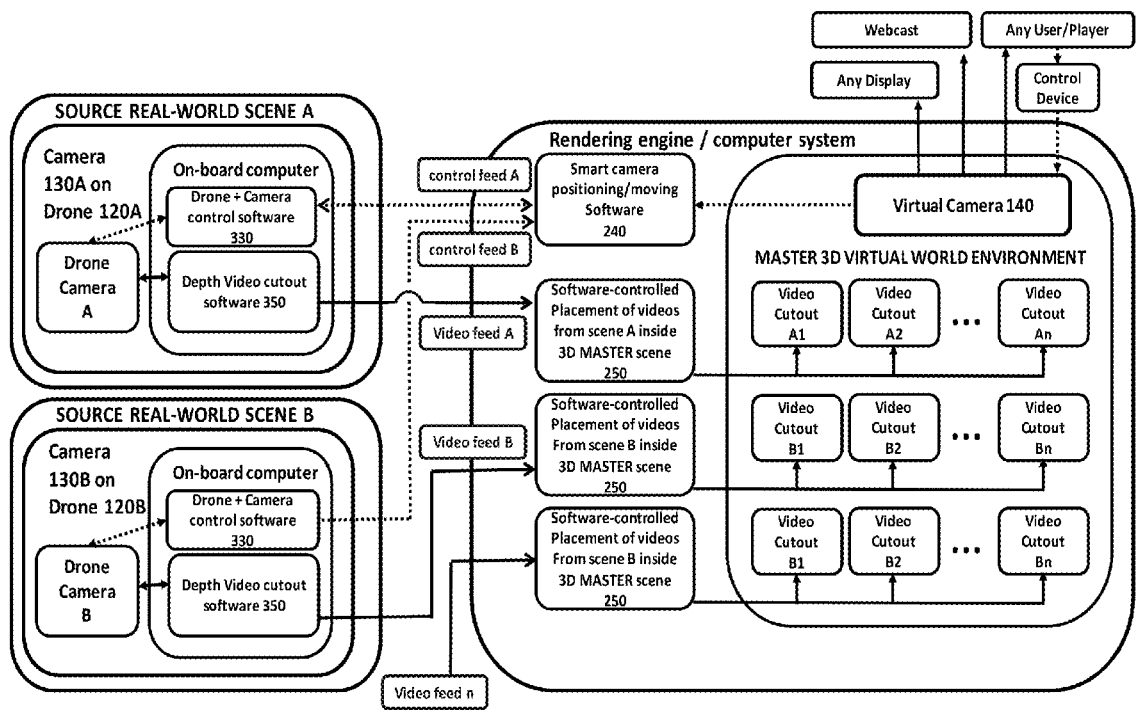
FIG. 13 is a block diagram schematically illustrating one example of inserting multiple source video feeds into multiple positions within a master 3D scene and generating a combined video, in accordance with the presently disclosed subject matter
Figure 14:
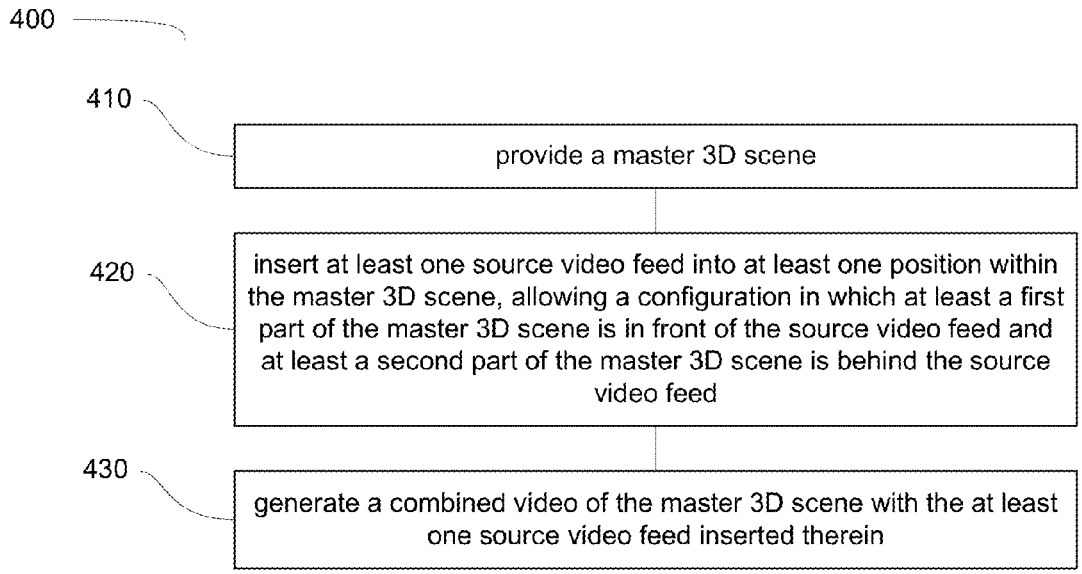
FIG. 14 is a flowchart illustrating one example of a sequence of operations carried out for generating a combined video, of a master 3D scene with at least one source video feed inserted therein, in accordance with the presently disclosed subject matter.
Figure 15:
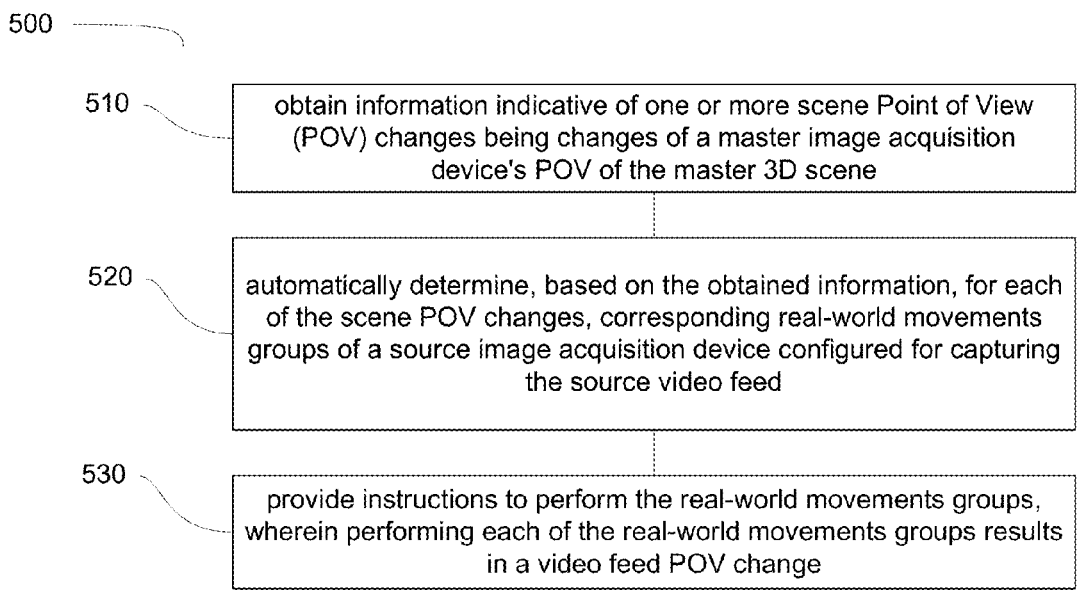
FIG. 15 is a flowchart illustrating one example of a sequence of operations carried out for maintaining synchronicity between a scene POV and a video feed POV while generating a combined video, in accordance with the presently disclosed subject matter.

In embodiments of the presently disclosed subject matter, fewer, more and/or different stages than those shown in FIG. 14-16 may be executed. In embodiments of the presently disclosed subject matter one or more stages illustrated in FIG. 14-16 may be executed in a different order and/or one or more groups of stages may be executed simultaneously. FIGS. 3, 11-13 illustrate a general schematic of the system architecture in accordance with an embodiment of the presently disclosed subject matter. Each module in FIGS. 3, 11-13 can be made up of any combination of software, hardware and/or firmware that performs the functions as defined and explained herein. The modules in FIGS. 3, 11-13 may be centralized in one location or dispersed over more than one location. In other embodiments of the presently disclosed subject matter, the system may comprise fewer, more, and/or different modules than those shown in FIGS. 3, 11-13.

Bearing this in mind, attention is drawn to FIG. 1, showing a schematic illustration of Virtual Studio Technology in accordance with the prior art.

The Virtual Studio Technology of the prior art includes use of a real-world studio 10. The real-world studio 10 can include special lighting equipment (e.g. chroma key lighting 12), and special background equipment (e.g. chroma key green color background 14) lit by the special lighting equipment. In the real-world studio 10, real-world video cameras 18a and 18b capture a first video 30 including (a) the background equipment lit by the special lighting equipment (hereinafter: "background portion"), and (b) at least one real-world physical object. In some cases, as in the illustrated example, the real-world physical object can be a person 16 (however it is not thus limited and the real-world physical object captured by the real-world video cameras can be any other real-world physical object, and not necessarily a living object).

The Virtual Studio Technology then replaces the background portion captured in the first video 30 featuring the at least one real-world physical object, which in the illustrated example is a person 16, with a second video 40 of a Three-Dimensional (3D) Computer Generated (CG) scene 20 virtually rendered by virtual cameras 24a and 24b. The 3D CG scene is generated by a computerized system (not shown).

The first video and the second video are then combined, using a dedicated component, by replacing the background portion with the second video 40. This gives rise to a third video 50 comprising the at least one real-world physical object (the person 16 in the illustrated example) of the first video 30 and the 3D CG scene including objects 22 (that can be virtual objects and/or real-world physical objects incorporated into the 3D CG scene) of the second video 40.

It can be appreciated that the first video 30, showing the at least one real-world physical object (e.g. person 16), can be regarded as a "master" video, and the second video 40 of the 3D CG scene 20 can be regarded as a "slave" video that replaces the background portion of the first video 30 in the newly generated third video 50. Therefore, in the Virtual Studio Technology of the prior art, the movements of the real-world video cameras 18a and 18b are the ones that determine the required movements of the virtual cameras 24a and 24b in order to maintain synchronicity between the point of views of the various real-world and virtual cameras.

Attention is drawn in this respect to FIG. 2, showing a schematic illustration of the relationship between the real-world camera and the virtual camera in Virtual Studio Technology in accordance with the prior art.

In the illustrated example, motions resulting in a change of position and/or orientation of the real-world cameras 18a and 18b are tracked by a motion tracking system (not shown). Such motions result in a change of one or more of the real-world cameras 18a and 18b POV of the scene. The computerized system that generates the second video 40 can be configured to calculate and perform a corresponding motion of the corresponding virtual cameras 24a and 24b in order to synchronize the real-world camera POVs of the scene (after making the motions) with the corresponding virtual camera POV of the real-world physical object.

It is to be noted in this respect, that each real-world camera is associated with a corresponding virtual camera (in the illustrated example the real-world camera 18a is associated with the virtual camera 24a and the real-world camera 18b is associated with the virtual camera 24b).

In the illustrated example, the motion tracking system senses a tilting motion of real-world camera 18b. The computerized system that generates the second video 40 then calculates and performs a corresponding motion of the corresponding virtual camera 24b in order to synchronize the real-world camera 18b POV with its corresponding virtual camera 24b POV.

It can be appreciated that the real-world camera 18b can be regarded as a "master" camera, whose repositioning is than translated to repositioning of the virtual camera 24b, which can be regarded as a "slave" thereof.

Having described the prior art, attention is now drawn to FIG. 3. FIG. 3 shows a schematic illustration of a system for inserting a source video feed into a master 3D scene and generating a combined video, in accordance with the presently disclosed subject matter.

Figure 10:
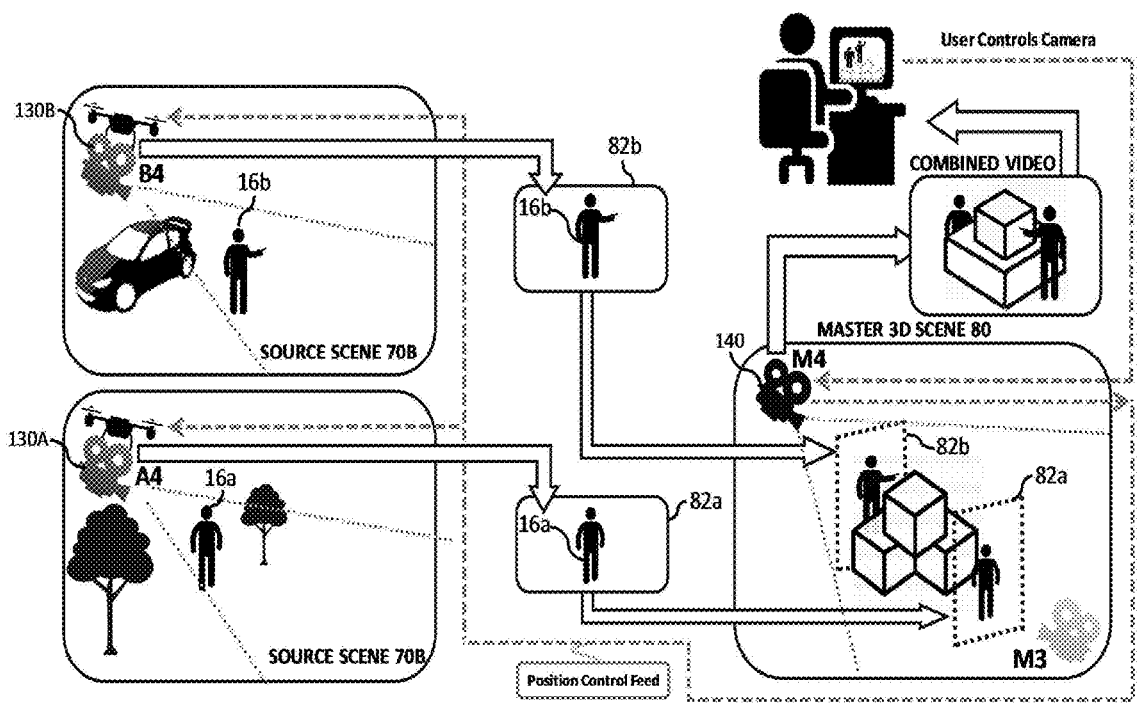
Figure 11:
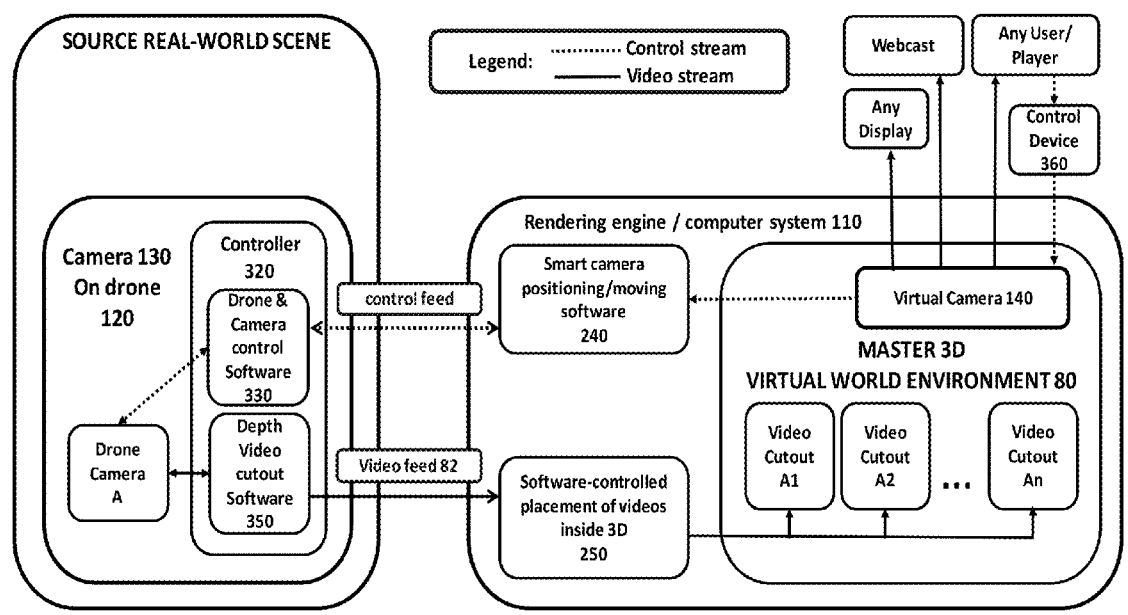
FIG. 11 is a block diagram schematically illustrating one example of a system for inserting a source video feed into a master 3D scene and generating a combined video, in accordance with the presently disclosed subject matter.

According to certain examples of the presently disclosed subject matter, system 100 comprises a computerized system 110, as further detailed inter alia with respect to FIGS. 10 and 11.

The system 100 can be configured to provide a master 3D scene. The master 3D scene can be a real-world 3D scene (comprising real-world objects) or a virtual 3D scene (comprising virtual objects), or a combination thereof. In this respect, the system 100 can further comprise one or more master image acquisition devices 140, each capable of acquiring a video of the master 3D scene (that can be everything captured by the master image acquisition device 140 in the video, or in a single shot comprised within the video). The master image acquisition devices 140 can optionally move, or be configured to move, at various points-in-time during acquisition of the video, thereby changing their Point-of-View (POV) of the master 3D scene, as further detailed herein.

As indicated above, the master 3D scene can be a real-world scene and in such cases the master image acquisition devices 140 can be real-world image acquisition devices, such as video cameras and/or any other devices capable of acquiring images that can form the video of the scene.

As further indicated above, the master 3D scene can be a virtual scene and in such cases the master image acquisition devices 140 can be virtual cameras. As indicated herein, a virtual camera can be defined by a virtual position (e.g. with respect to a certain object or point/s in the virtual scene), a virtual orientation (e.g. with respect to a certain object or point/s in the virtual scene), and a virtual viewing angle (the angle of view that the virtual camera encompasses/sees). The virtual position, and virtual orientation define the virtual camera's Point-of-View (POV) of the master 3D scene (also referred to herein as "Scene POV").

The system 100 further comprises one or more source image acquisition devices 130 capable of acquiring at least one source video feed, being a video feed of at least one real-world physical object. It is to be noted that the source image acquisition devices 130 can be real-world video cameras and/or any other devices capable of acquiring images that can form the source video feed of the at least one real-world physical object. In some cases, the real-world physical object can be a live person, however, it can be any other real-world physical object, and not necessarily a living object.

In some cases, the computerized system 110 can receive (e.g. via communication network 150) the at least one source video feed and insert it into at least one position within the master 3D scene, as further detailed herein, inter alia with reference to FIGS. 5-12. In some cases, the source video feed can be inserted into the master 3D scene so that at least a first part of the master 3D scene is in front of the source video feed and at least a second part of the master 3D scene is behind the source video feed (as opposed to merely being superimposed over the master 3D scene).

The computerized system 110 can be further configured to generate a combined video of the master 3D scene with the source video feed (that can optionally be a live video feed) inserted therein, as further detailed herein, inter alia with reference to FIG. 5-14.

In some cases, the computerized system 110 can receive information relating to at least one Scene POV, and in some cases additional information relating to movements of the master image acquisition device 140 changing its Scene POV (i.e. its virtual position and/or virtual orientation) over time. Such information can optionally be obtained in real-time. In some cases, such information can be received by the computerized system 110 utilizing a communication network 150, through which the computerized system 110 and the master image acquisition device 140 can communicate (e.g. via a wired and/or wireless connection thereto). It is to be noted that such information can alternatively be provided in other manners, including off-line (e.g. using CDs, flash drives, hard drives, or any other suitable device capable of obtaining the information from the master image acquisition device 140 and providing it to the computerized system 110).

In some cases, at least one of the source image acquisition devices 130 can be mounted on movable device 120 capable of moving in one or more degrees of freedom (and optionally in six degrees of freedom). The movable device 120 can be any device capable of moving an image acquisition device mounted thereon in at least one degree of freedom. Some non-limiting examples of movable devices 120 include electrical dollies, cranes, dolly & crane combinations, jib-camera-arms, camera-booms, etc. In a more particular example, the movable device 120 can be a flying drone.

It is to be noted that each movement of a movable device 120 mounting a corresponding source image acquisition device 130, results in a change of the corresponding source image acquisition device 130 POV of the real-world physical object. It is to be further noted that in some cases, more than one source image acquisition device 130 can be mounted on a single movable device 120.

The computerized system 110 can be configured to control the movements of the movable devices 120, as further detailed herein, for maintaining synchronicity between the scene POV and the video feed POV while generating the combined video.

For that purpose, the computerized system 110 can be operatively connected to the movable device 120. In some cases, the connection can be established utilizing a communication network 150, to which the computerized system 110 and the movable device 120 (or any other device capable of causing the movable device to perform various movements according to received instructions) can be connected (e.g. via a wired and/or wireless connection).

Figure 4:
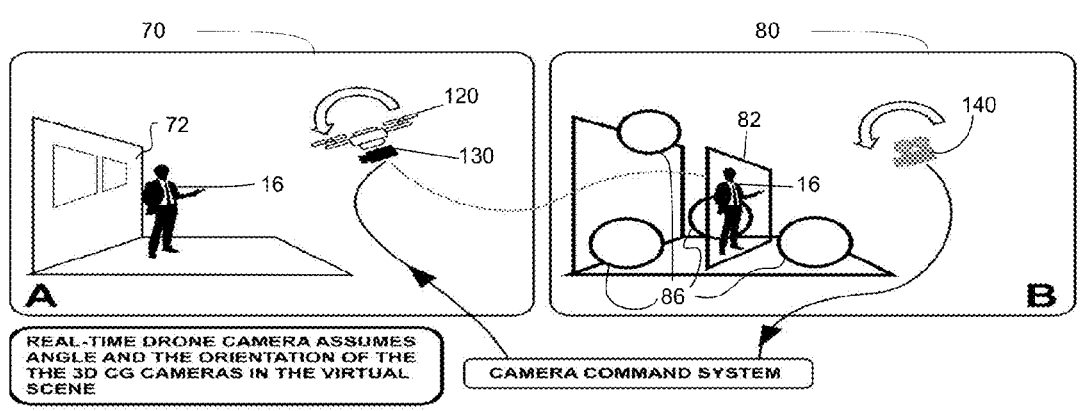
FIG. 4 is a schematic illustration of an exemplary operation of a computerized system for inserting a source video feed into a master 3D scene and generating a combined video, in accordance with the presently disclosed subject matter.

Attention is now drawn to FIGS. 4-10, showing several examples of the computerized system's operation. In FIG. 4, there is shown a schematic illustration of an exemplary operation of a computerized system for inserting a source video feed into a master 3D scene and generating a combined video, in accordance with the presently disclosed subject matter.

As indicated above, computerized system 110 can be configured to provide a master 3D scene 80. In some cases, the master 3D scene 80 can be a real-world scene, a virtual scene or a combined real-world and virtual scene (e.g. a real-world scene including virtual objects, or a virtual scene including real-world objects). The master 3D scene 80 can include one or more objects 86. In some cases, the objects 86 can be virtual objects and in other cases, the objects 86 can be real-world physical objects. In some cases, some of the objects 86 can be virtual objects and some of the objects 86 can be real-world physical objects.

After providing the master 3D scene 80, the computerized system 110 (not shown in FIG. 4) can be configured to insert at least one source video feed 82 into at least one position within the master 3D scene 80. The source video feed 82 can be inserted in a manner allowing a configuration in which at least a first part of the master 3D scene 80 is in front of the source video feed 82 and at least a second part of the master 3D scene 80 is behind the source video feed 82. It can be appreciated that the source video feed 82 in the illustrated example is inserted into the master 3D scene 80 so that, from a perspective of a master image acquisition device 140, at least one of the objects 86 is in front of the source video feed 82 and at least one of the objects 86 is behind the source video feed 82. In some cases, the source video feed 82 can be a two-dimensional (2D) video feed, and in other cases, it can be a 3D video feed or a 2D video feed with additional depth information.

The source video feed 82 inserted into the master 3D scene 80 can be a raw video feed captured by the source image acquisition device 130. In other cases, the source video feed 82 can be an extraction of one or more objects from such raw video feed. In the illustrated example, the source video feed 82 is a video feed of a person 16 (being a real-world object) extracted from the background 72 of a source scene 70 captured by a source image acquisition device 130.

In some cases, the extraction of the objects can be performed using a combination of depth keying, with Chroma-keying. For such purposes, a Chroma-key green patch can be placed below the real-world physical object for removing the real-world surface on which the real-world physical object is placed, as shown in the illustration provided in FIG. 17. In some cases, depth keying can be performed on a certain upper portion of the real-world physical object (e.g. 70% of the real-world physical object) and Chroma-keying can be performed on a certain lower portion of the real-world physical object (e.g. 30% of the real-world physical object), and the results of the depth-keying and Chroma-keying can be merged to form the entire real-world physical object. It is to be noted however that extracting real-world physical objects from the raw video feed can additionally or alternatively be performed using other known methods and techniques.

The computerized system 110 can be further configured to generate a combined video of the master 3D scene 80 with the source video feed 82 inserted therein. The combined video can be captured (rendered) by one or more master image acquisition devices 140. It is to be noted that in some cases, during at least a first part of the combined video, the source video feed 82 can be at least partially occluded by at least part of at least one of the objects 86 of the master 3D scene 80 and during at least a second part of the combined video at least part of the source video feed 82 can at least partially occlude at least one of the objects 86 of the master 3D scene 80.

The master image acquisition devices 140 can optionally perform, or be pre-configured to perform, one or more movements groups at a corresponding point-in-time of the combined video. Each movements group can comprise one or more movements in one or more degrees of freedom. Performing the movement groups result in a change of the master image acquisition devices 140 Point-of-View (POV) of the master 3D scene 80 including the inserted source video feed 82. In some cases, the master image acquisition devices 140 can move in at least three degrees of freedom. The computerized system 110 can be configured to maintain (i.e. anchor) the positions of the inserted source video feed 82 within the master 3D scene 80 in the combined video, e.g. using known anchoring methods and techniques, while rotating the inserted source video feed 82 (around its X and/or Y and/or Z axis, depending on the movement of the master image acquisition device 140) so that the inserted source video feed 82 continuously faces the master image acquisition device 140. Various billboarding method and techniques can be used for rotating the inserted source video feed 82 to continuously face the master image acquisition device 140.

In the illustrated example, master image acquisition device 140 (that, as indicated above, can be a real-world camera or a virtual camera) performs a forward tilting movement at a certain point-in-time during acquisition of the combined video. Such tilting motion results in a change of its POV of the master 3D scene 80 and the inserted source video feed 82. There is a need in changing the source image acquisition device 130 POV of the at least one real-world physical object (presenter 16) in a similar manner for maintaining synchronicity between the master image acquisition device 140 POV of the master 3D scene 80 and the source image acquisition device 130 POV of the presenter 16. There is also a need in tilting the inserted source video feed 82 so that it continuously faces the master image acquisition device 140.

It is to be noted that in case the master image acquisition devices 140 are virtual cameras, information of their movement can be obtained, optionally in advance, from the computerized system that controls them. If, however, the first image acquisition devices 140 are real-world cameras, tracking of their movements may be required. Tracking of such movements can be performed for example utilizing various camera movement tracking mechanisms.

The computerized system 110 can be configured to automatically determine (e.g. by the computerized system 110, as further detailed herein, inter alia with respect to FIG. 15), for each movements group of each master image acquisition device 140, performed, or configured to be performed, at a corresponding point-in-time of the combined video, corresponding movements to be made by a movable device 120 mounting the corresponding source image acquisition device 130 (if such corresponding source image acquisition device 130, corresponding to the master image acquisition device 140 that makes the movements group exists), at a corresponding point-in-time of the source video. Performing such corresponding movements change the source image acquisition device 130 POV of the at least one real-world physical object in a manner substantially identical (as in some cases a certain discrepancy, e.g. of up to five, ten, fifteen, or twenty degrees in each direction, can be allowed) to the change of the master image acquisition device 140 POV of the master 3D scene 80.

Performing such changes to the source image acquisition device 130 POV of the at least one real-world object enables maintaining synchronicity between the master image acquisition device 140 POV of the master 3D scene 80 and the source image acquisition device 130 POV of the at least one real-world object in the source video. It is to be noted that the synchronicity between the master image acquisition device 140 POV of the master 3D scene 80 and the source image acquisition device 130 POV of the at least one real-world object is maintained (or substantially maintained) by making the changes to the source image acquisition device 130 POV of the at least one real-world physical object in a manner substantially identical (as in some cases a certain discrepancy, e.g. of up to five, ten, fifteen, or twenty degrees in each direction, can be allowed) to the change of the master image acquisition device 140 POV of the master 3D scene 80.

It is to be further noted that in some cases:

(a) The scale of the inserted source video feed 82 within the master 3D scene is maintained substantially constant (some minor changes, for example of ±10%, may be acceptable, optionally depending on the content of the scene); and (b) The source image acquisition device 130 is also required to maintain a constant scale of the at least one real-world physical object. Therefore, the distance between the source image acquisition device 130 and the at least one real-world object of the source video feed is maintained substantially constant (some minor changes, for example of ±10%, may be acceptable, optionally depending on the content of the scene), even if the master image acquisition device 140 moves closer to, or away from, the inserted video feed 82 inserted into the master 3D scene 80.

(a) and (b) enable synchronizing the scales of the objects 86 and the inserted video feed 28 when the master image acquisition device 140 zooms in or out or moves closer to or away from the objects 86 and/or the inserted video feed 82. A more detailed explanation is provided herein, with reference to FIG. 18.

In some cases, the determination of the movements to be made by the source image acquisition devices 130 can be performed in real-time during acquisition of the source video feed 82. In other cases, the determination of the movements to be made by the source image acquisition devices 130 can be performed in advance, and optionally in a manner that provides the source image acquisition devices 130 with a minimal time required to perform the movements for maintaining synchronicity, between the master image acquisition device 140 POV of the master 3D scene 80 and the source image acquisition device 130 POV of the at least one real-world object, during generating the combined video.

According to certain examples of the presently disclosed subject matter, the computerized system 110 can be further configured to provide instructions to perform the determined movements, at the corresponding point-in-time of the source video, e.g. utilizing movable devices 120, as further detailed herein, for maintaining synchronicity between the master image acquisition device 140 POV of the master 3D scene 80 and the corresponding source image acquisition device 130 POV of the at least one real-world object while generating the combined video.

According to certain examples of the presently disclosed subject matter, the computerized system 110 can further enable inserting the at least one source video feed 82 comprising the real-world object into multiple places within the master 3D scene 80, optionally, in a different scale at each place. In addition, the computerized system 110 can enable inserting, into the given master 3D scene 80, a plurality of source video feeds 82, each optionally comprising a distinct real-world object, each captured by real-world cameras located at distinct source scene 70 (e.g. in different geographical locations), so that even if the real-world objects are located at different geographical locations, they will appear as if they are at the same location, i.e. inside the master 3D scene 80.

It can be appreciated that utilizing the presently disclosed subject matter, the generated scene shown in the combined video is not limited to a space defined by the physical boundaries of a studio as in the Virtual Studio Technologies (as the distance of the source image acquisition device 130 POV from the at least one real-world object is substantially constant, even if the distance of the master image acquisition device 140 POV from the master 3D scene 80, and more specifically from the source video feed 82, is changed). In addition, there is no need for additional personnel to set the lighting, calibrate the cameras, set-up tracking systems, etc.

It is to be further noted that according to the presently disclosed subject matter, the known paradigm of the Virtual Studio Technology is broken as the "master" became the "slave" and the "slave" became the "master". The virtual camera (i.e. the master image acquisition device 140) is now the "master", whose repositioning is translated to repositioning of the real-world camera (source image acquisition device 130), which can be regarded as a "slave" thereof.

Figure 5:
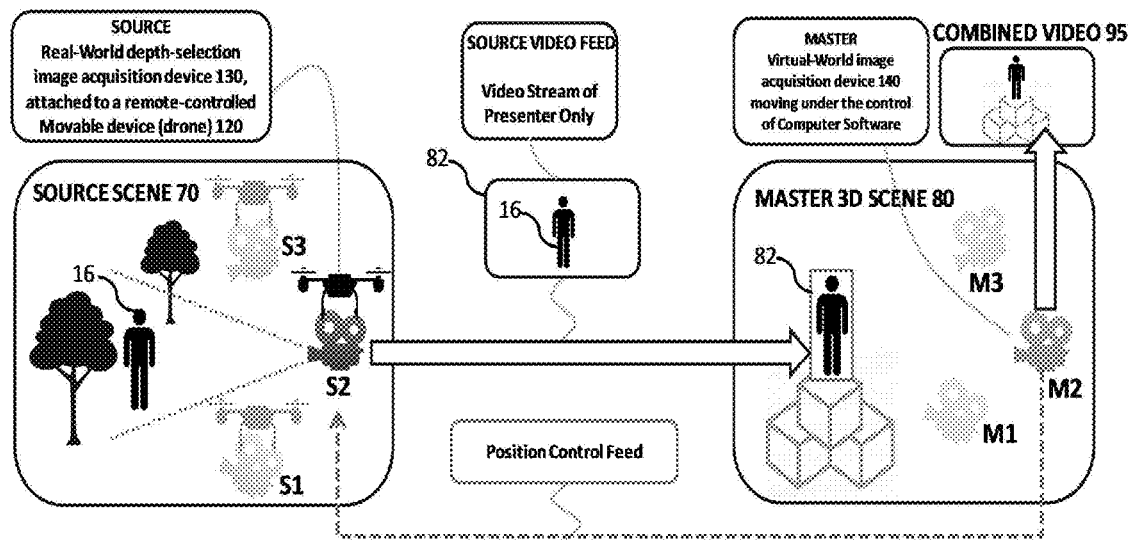
FIG. 5 is a schematic illustration of another exemplary operation of a computerized system for inserting a source video feed into a master 3D scene and generating a combined video, in accordance with the presently disclosed subject matter.

Turning to FIG. 5, there is shown another schematic illustration of an exemplary operation of a computerized system for inserting a source video feed into a master 3D scene and generating a combined video, in accordance with the presently disclosed subject matter.

In this figure, the example provided is more specific. A virtual master 3D scene 80 is provided. A real-world depth-selection image acquisition device 130, captures a video (optionally in real-time) of a real-world source scene 70. The real-world depth-selection image acquisition device 130, or another device configured therefore, extracts from the captured video a source video feed 82 of a real-world person 16. The extracted source video feed 82 is inserted, by the computerized system, into a certain position within the virtual master 3D scene 80 (onto the highest cube shown therein).

A combined video 95, of the virtual master 3D scene 80 with the source video feed 82 inserted therein, is rendered, optionally in real-time, by the master virtual-world image acquisition device 140 (being a virtual camera in the illustrated example). The master virtual-world image acquisition device 140 can move during rendering of the combined video 95. The movements can be performed automatically using software, or manually by a user having control of the position of the master virtual-world image acquisition device 140.

In the illustrated example, the master virtual-world image acquisition device 140 moves, during rendering of the combined video 95, from position M1 to position M2. When the master virtual-world image acquisition device 140 is still in position M1, and the real-world depth-selection image acquisition device 130 is still in position 51, a position control feed is sent to the real-world depth-selection image acquisition device 130, or to a movable device 120 (e.g. flying drone) mounting it, to move to position S2. This enables maintaining, during rendering of the combined video 95, the synchronicity between (a) the master virtual-world image acquisition device 140 POV of the master 3D scene 80, and (b) the real-world depth-selection image acquisition device 130 POV of the person 16.

Figure 6:
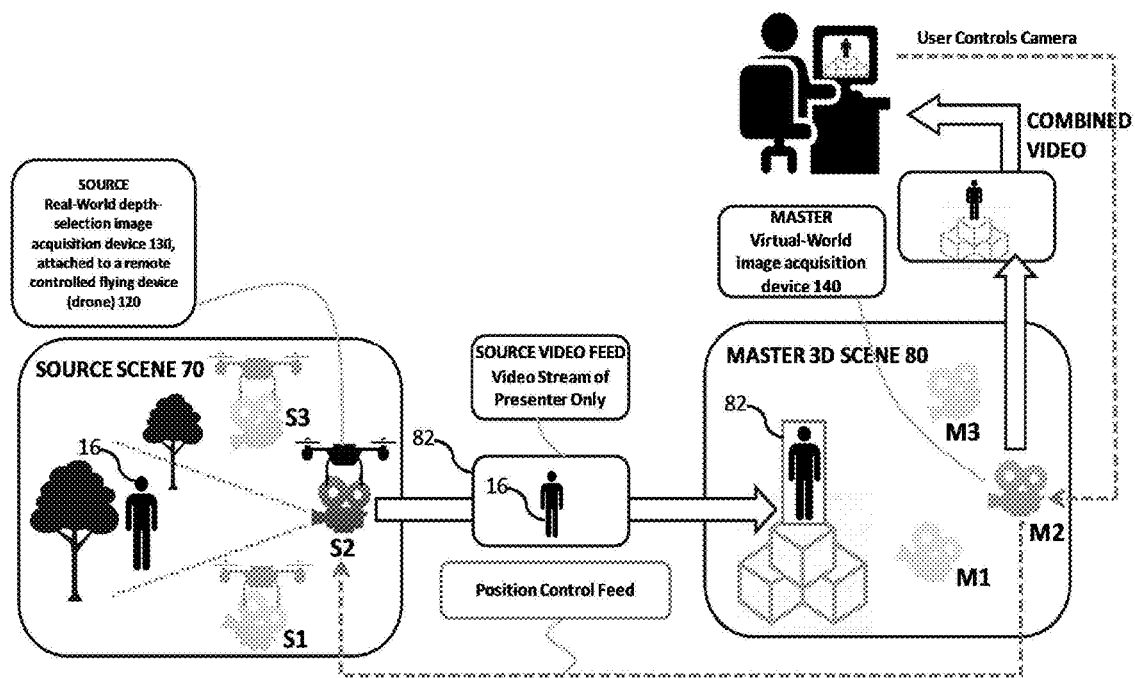
FIG. 6 is another schematic illustration of an exemplary operation of a computerized system for inserting a source video feed into a master 3D scene and generating a combined video, in accordance with the presently disclosed subject matter.

FIG. 6, shows another schematic illustration of an exemplary operation of a computerized system for inserting a source video feed into a master 3D scene and generating a combined video, in accordance with the presently disclosed subject matter.

As indicated above, the master virtual-world image acquisition device 140 can move during rendering of the combined video 95. The movements can be performed by a user, optionally in real-time. The user can change the position and/or orientation of the master virtual-world image acquisition device 140 using keyboard, joystick and/or any other position-control tool (including AR/VR glasses or helmets) enabling providing instructions for moving in at least one, and optionally in all six, degrees of freedom.

The computerized system can obtain information about such position and/or orientation changes, before such changes are actually made, and determine, based on the obtained information, respective movements to be made, in a synchronized manner, by the real-world depth-selection image acquisition device 130. The computerized system can then provide instructions to the real-world depth-selection image acquisition device 130 to perform the determined respective movements, in parallel to the movements made by the master virtual-world image acquisition device 140. By doing so, the real-world depth-selection image acquisition device 130 mounted on the movable device 120 (e.g. flying drone) will move from its current position (51) to a future position (S2) in parallel to the master virtual-world image acquisition device 140 moving from its current position M1 to a future position M2.

Figure 7:
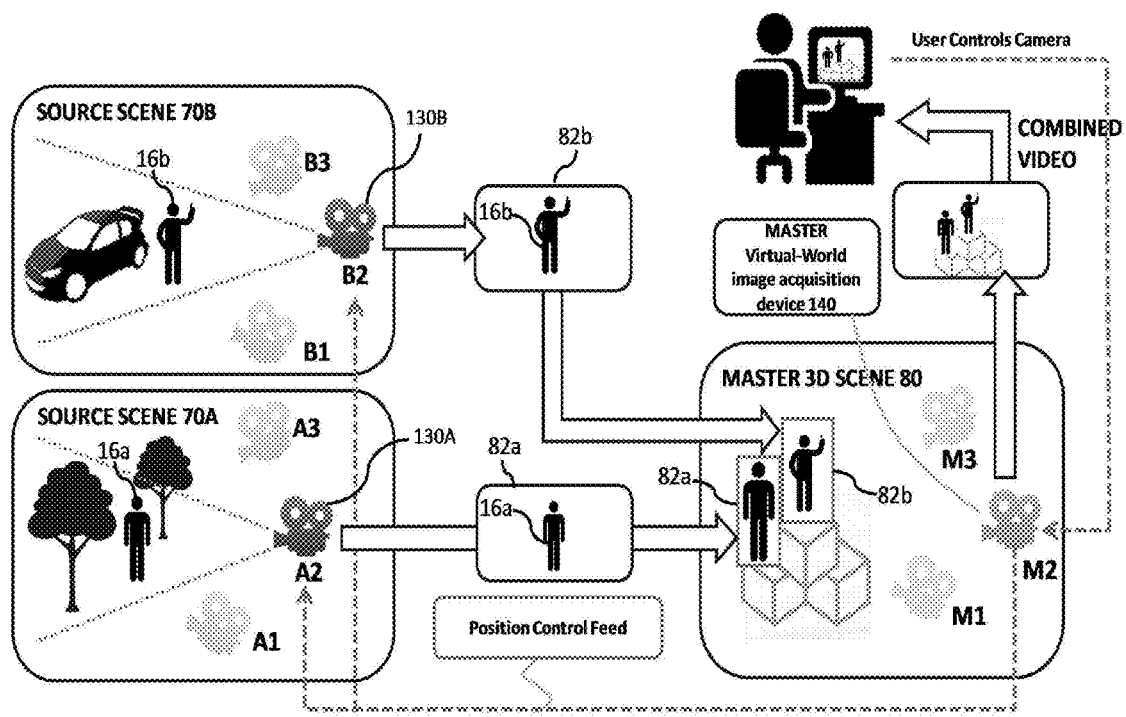
FIG. 7 is a schematic illustration of an exemplary operation of a computerized system for inserting two different source video feeds into a master 3D scene and generating a combined video, in accordance with the presently disclosed subject matter.

FIG. 7 shows a schematic illustration of an exemplary operation of a computerized system for inserting two different source video feeds into a master 3D scene and generating a combined video, in accordance with the presently disclosed subject matter.

Also in this example, a virtual master 3D scene 80 is provided. In addition, two different real-world depth-selection image acquisition devices 130A and 130B, capture a video (optionally in real-time), each in a different real-world source scene 70A and 70B respectively. The first real-world depth-selection image acquisition devices 130A captures a first video in a first real-world scene 70A, in which a person 16a is shown in an environment including trees. The second real-world depth-selection image acquisition devices 130B captures a second video in a second real-world scene 70B, in which another person 16b is shown in an environment including a car.

The first real-world depth-selection image acquisition device 130A, or another device configured therefore, extracts from the first captured video a first source video feed 82a of the real-world person 16a. The extracted first source video feed 82a is inserted, by the computerized system, into a certain position within the virtual master 3D scene 80 (onto the lower left cube shown therein). The second real-world depth-selection image acquisition device 130B, or another device configured therefore, extracts from the second captured video a second source video feed 82b of the other real-world person 16b. The extracted second source video feed 82b is inserted, by the computerized system, into another position within the virtual master 3D scene 80 (onto the highest cube shown therein).

A combined video 95, of the virtual master 3D scene 80 with the first source video feed 82a and the second source video feed 82b inserted therein, is rendered, optionally in real-time, by the master virtual-world image acquisition device 140 (being a virtual camera in the illustrated example). The master virtual-world image acquisition device 140 can move during rendering of the combined video 95. The movements can be performed automatically using software, or manually by a user having control of the position of the master virtual-world image acquisition device 140 as shown in the illustrated example.

In the illustrated example, the master virtual-world image acquisition device 140 moves, during rendering of the combined video 95, from position M1 to position M2. When the master virtual-world image acquisition device 140 is still in position M1, and the real-world depth-selection image acquisition devices 130A and 130B are still in positions A1 and B1 respectively, a position control feed is sent to the real-world depth-selection image acquisition devices 130A and 130B, or to movable devices 120 (e.g. flying drones) respectively mounting them, to move to positions A2 and B2 respectively. This enables maintaining, during rendering of the combined video 95, the synchronicity between (a) the master virtual-world image acquisition device 140 POV of the master 3D scene 80, (b) the first real-world depth-selection image acquisition device 130A POV of the first presenter 16a, and (c) the second real-world depth-selection image acquisition device 130B POV of the second presenter 16b.

Figure 8:
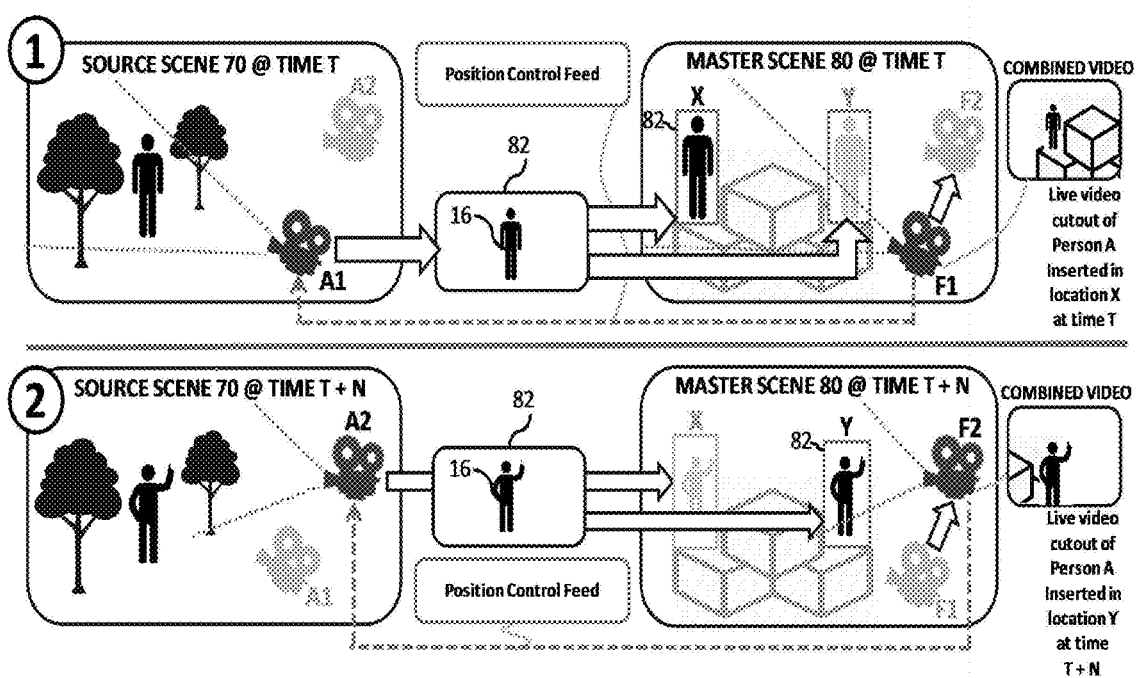
FIG. 8 is a schematic illustration of an exemplary operation of a computerized system for inserting a given source video feed into multiple positions within the master 3D scene, and generating a combined video, in accordance with the presently disclosed subject matter.

Attention is drawn to FIG. 8, showing a schematic illustration of an exemplary operation of a computerized system for inserting a given source video feed into multiple positions within the master 3D scene, and generating a combined video, in accordance with the presently disclosed subject matter.

A virtual master 3D scene 80 is provided. A real-world depth-selection image acquisition device 130, captures a video (optionally in real-time) in a real-world source scene 70. At a first point-in-time T, the real-world depth-selection image acquisition device 130 is positioned in a first position A1. The real-world depth-selection image acquisition device 130, or another device configured therefore, extracts from the captured video a source video feed 82 of a real-world person 16. The extracted source video feed 82 is inserted, by the computerized system, into position X within the virtual master 3D scene 80 (onto the left-hand cube shown therein).

A combined video 95, of the virtual master 3D scene 80 with the source video feed 82 inserted therein, is rendered, optionally in real-time, by the master virtual-world image acquisition device 140 (being a virtual camera in the illustrated example). The master virtual-world image acquisition device 140 can move during rendering of the combined video 95. The movements can be performed automatically using software, or manually by a user having control of the position of the master virtual-world image acquisition device 140.

In the illustrated example, after a certain time period N, the master virtual-world image acquisition device 140 moves, during rendering of the combined video 95, from position F1 to position F2. When the master virtual-world image acquisition device 140 is still in position F1, and the real-world depth-selection image acquisition device 130 is still in position A1, a position control feed is sent to the real-world depth-selection image acquisition device 130, or to a movable device 120 (e.g. flying drone) mounting it, to move to position A2. This enables maintaining, during rendering of the combined video 95, the synchronicity between (a) the master virtual-world image acquisition device 140 POV of the master 3D scene 80, and (b) the real-world depth-selection image acquisition device 130 POV of the presenter. In addition to changing the positions of the image acquisition devices 130 and 140, the source video feed 82 is also moved within the master 3D scene 80, to position Y (onto the right-hand cube shown therein). The result will be that during a first part of the combined video (until time T+N), the source video feed 82 will be presented in the first position X, and not shown in the second position Y, and during a second part of the combined video (starting at time T+N) the source video feed 82 will be presented in the second position Y, and not shown in the first position X.

Figure 9:
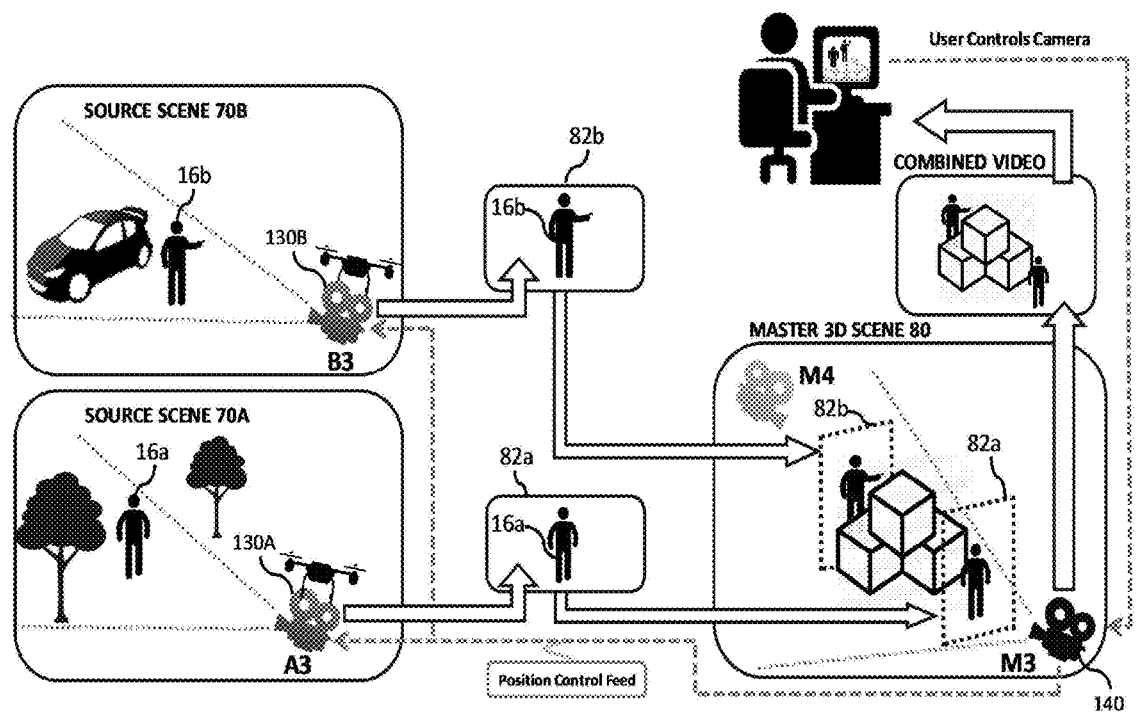
FIGS. 9 and 10 are schematic illustrations of an exemplary operation of a computerized system for inserting multiple source video feeds into multiple positions within a master 3D scene, and the effect of a point-of-view of a master image acquisition device of the master 3D scene on mutual occlusions in a combined video, in accordance with the presently disclosed subject matter.

Turning to FIGS. 9 and 10, there are shown schematic illustrations of an exemplary operation of a computerized system for inserting multiple source video feeds into multiple positions within a master 3D scene, and the effect of a point-of-view of a master image acquisition device of the master 3D scene on mutual occlusions in a combined video, in accordance with the presently disclosed subject matter.

Also in the examples shown in FIGS. 9 and 10, a virtual master 3D scene 80 is provided (the same virtual master 3D scene 80 in both FIGS. 9 and 10). In addition, two different real-world depth-selection image acquisition devices 130A and 130B, capture a video (optionally in real-time), each in a different real-world source scene 70A and 70B respectively. The first real-world depth-selection image acquisition devices 130A captures a first video in a first real-world scene 70A, in which a person 16a is shown in an environment including trees. The second real-world depth-selection image acquisition devices 130B captures a second video in a second real-world scene 70B, in which another person 16b is shown in an environment including a car.

In both FIGS. 9 and 10, the first real-world depth-selection image acquisition device 130A, or another device configured therefore, extracts from the first captured video a first source video feed 82a of the real-world person 16a. The extracted first source video feed 82a is inserted, by the computerized system, into a certain position within the virtual master 3D scene 80. The second real-world depth-selection image acquisition device 130B, or another device configured therefore, extracts from the second captured video a second source video feed 82b of the other real-world person 16b. The extracted second source video feed 82b is inserted, by the computerized system, into another position within the virtual master 3D scene 80.

Also in both FIGS. 9 and 10, a combined video 95, of the virtual master 3D scene 80 with the first source video feed 82a and the second source video feed 82b inserted therein, is rendered, optionally in real-time, by the master virtual-world image acquisition device 140 (being a virtual camera in the illustrated example).

FIG. 9 illustrates a first time-window during which the combined video is generated. During this time window, the master virtual-world image acquisition device 140 is positioned in position M3, and the combined video is generated so that the first source video feed 82a is in front of the cubical objects, and the second source video feed 82b is behind the cubical objects. Therefore, the first source video feed 82a partially occludes the cubical objects and the cubical objects partially occlude the second source video feed 82b.

As indicated herein, the master virtual-world image acquisition device 140 can move during rendering of the combined video 95. FIG. 10 illustrates a second time-window, after the master virtual-world image acquisition device 140 is moved to position M4. The positions of the first source video feed 82a and the second source video feed 82b did not change (however they have been rotated so that they keep facing the master virtual-world image acquisition device 140), but the POV of the master virtual-world image acquisition device 140 of the master 3D scene did change. Therefore, the combined video is generated so that now the second source video feed 82b is in front of the cubical objects, and the first source video feed 82a is behind the cubical objects. Therefore, the second source video feed 82b partially occludes the cubical objects and the cubical objects partially occlude the first source video feed 82a.

Turning to FIG. 11, there is shown a block diagram schematically illustrating one example of a system for inserting a source video feed into a master 3D scene and generating a combined video, in accordance with the presently disclosed subject matter.

According to certain examples of the presently disclosed subject matter, the system can comprise a computerized system 110. The computerized system 110 can comprise one or more network interfaces (not shown) enabling connecting the computerized system 110 to one or more communication networks 150, via a wired and/or wireless connection, and enabling it to send and receive data sent thereto through such communication networks 150, including sending and/or receiving data to/from the master image acquisition devices 140 and/or source image acquisition device 130 and/or movable devices 120 mounting one or more source image acquisition devices 130, as further detailed herein. Some examples of data that can be transferred through the network interface include control feeds and video feeds, as further detailed herein.

Computerized system 110 can further comprise, or be otherwise associated with, a data repository (e.g. a database, a storage system, a memory including Read Only Memory—ROM, Random Access Memory—RAM, or any other type of memory, etc.) configured to store data, including inter alia data relating to one or more movement groups to be made by the master image acquisition devices 140 at corresponding points-in-time of corresponding combined videos, etc., as further detailed herein. In some cases, data repository can be further configured to enable retrieval and/or update and/or deletion of the stored data.

Computerized system 110 further comprises one or more processing resources (not shown). Processing resource can be one or more processing units (e.g. central processing units), microprocessors, microcontrollers or any other computing devices or modules, including multiple and/or parallel and/or distributed processing units, which are adapted to independently or cooperatively process data for controlling relevant computerized system 110 resources and for enabling operations related to computerized system 110 resources.

The processing resource can comprise one or more of the following modules: positioning module 240 and source feeds placement module 250.

According to some examples of the presently disclosed subject matter, positioning module 240 can be configured to determine movement groups to be performed by movable devices 120, mounting corresponding source image acquisition device 130, at corresponding points-in-time, as further detailed herein, inter alia with respect to FIG. 15.

According to some examples of the presently disclosed subject matter, source feeds placement module 250 can be configured to place at least one source video feed inside at least one position within a master 3D scene 80, as further detailed herein, inter alia with respect to FIG. 14.

It is to be noted that computerized system 110 can be distributed on a plurality of computers, optionally located at a plurality of geographical locations.

The system can further comprise one or more source image acquisition devices 130, optionally mounted on respective movable devices 120 (e.g. drone). According to certain examples of the presently disclosed subject matter, the source image acquisition device 130 and/or the movable device 120 can comprise one or more network interfaces (not shown) enabling connecting the source image acquisition device 130 and/or the movable device 120 to one or more communication networks 150, and enabling transfer of data through such communication networks 150, including sending and/or receiving video feeds and control feeds data to/from the computerized system 110, as further detailed herein.

The source image acquisition device 130 and/or the movable device 120 can further comprises a controller 320 (that can optional be distributed between the source image acquisition device 130 and the movable device 120, or any other device capable of instructing the movable device 120 to perform real-world movements). The controller 320 can be configured to control the movements of the movable device 120 (e.g. drone), e.g. utilizing a movement control module 330, as further detailed herein, inter alia with respect to FIG. 16. The controller 320 can optionally further comprise a depth video cut-out software 350, configured to extract one or more objects from videos captured by the source image acquisition device 130, as further detailed herein.

The computerized system 110 can receive one or more source video feeds 82. The source video feeds 82 can be video feeds that have been extracted (e.g. using the depth video cut-out software 350) from videos captured by one or more source image acquisition devices 130. The computerized system 110 can utilize the source feeds placement module 250 to place the source video feeds 82 inside a master 3D scene 80. Computerized system can then start rendering a combined video. It is to be noted that computerized system 110 can also utilize the source feeds placement module 250 to manipulate the position and/or orientation of source video feeds 82 placed inside the master 3D Scene 80.

As indicated herein, the master virtual-world image acquisition device 140 can move during rendering of the combined video. The movements can be performed automatically using software, or manually by a control device 360 operated by a user having control of the position of the master virtual-world image acquisition device 140. As further indicated herein, the computerized system 110 can obtain information about such movements, before they are actually made.

Based on the obtained information, the computerized system, utilizing the positioning module 240, can determine respective movements to be made, in a synchronized manner, by the source image acquisition device 130. The computerized system 110 can then provide a control feed comprising instructions to the controller 320 to perform the determined respective movements, in parallel to the movements made by the master image acquisition device 140. The controller 320 can be configured to perform the determined movements, e.g. utilizing movement control module 330.

Throughout the process of generating the combined video, or at any later stage, the combined video can be streamed to any display (including a display of the user controlling the master image acquisition device 140), directly or via a webcast.

As indicated herein, the operation of the system enables reversing the conventional Virtual Studio Technology's concept, by feeding real video feeds directly into a computer-generated scene, and reversing the control of the cameras movements, by making the virtual camera control the movements of the real-world camera and not the other way around. In addition, it makes compositing system (where usually adding/combining source and CG video feeds happen) redundant, therefore simplifying process from three main phases (generating first video, generating second video, combining first and second videos into a third video) to only two (generate first video, generate a second video including the first video already placed inside).

Figure 12:
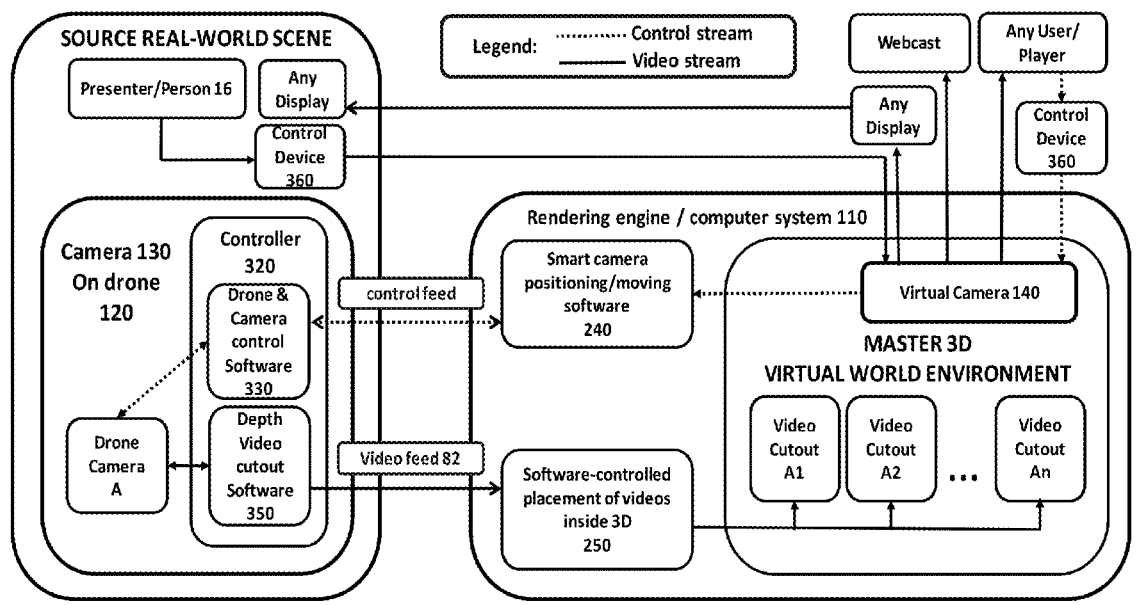
FIG. 12 is another block diagram schematically illustrating one example of a system for inserting a source video feed into a master 3D scene and generating a combined video, in accordance with the presently disclosed subject matter.

FIG. 12 is another block diagram schematically illustrating one example of a system for inserting a source video feed into a master 3D scene and generating a combined video, in accordance with the presently disclosed subject matter.

As indicated with reference to FIG. 11, the master virtual-world image acquisition device 140 can move during rendering of the combined video. The movements can be performed automatically using software, or manually by a control device 360 operated by a user having control of the position of the master virtual-world image acquisition device 140. In the example illustrated in FIG. 12, the control device 360 is located at the source scene 70, thereby enabling a user (optionally the person 16 that is recorded in the source video feed 82) that is located at the source scene 70 to control the movements of the master image acquisition device 140 (which will result in corresponding movements by the source image acquisition device 130).

For this purpose, the user located at the source scene 70 can view the combined video on a display located in its vicinity, optionally in real-time. This enables the person 16 to view himself/herself within the master 3D scene 80, and control the master image acquisition device 140 position and/or orientation. As indicated herein, upon changing the master image acquisition device 140 position and/or orientation, corresponding movements are made by the source image acquisition device 130 capturing the person 16, to maintain synchronicity between the scene POV and the video feed POV (optionally being the source image acquisition device 130 POV of the person 16).

FIG. 13 is a block diagram schematically illustrating one example of inserting multiple source video feeds into multiple positions within a master 3D scene and generating a combined video, in accordance with the presently disclosed subject matter.

As indicated herein, the computerized system 110 can enable insertion of a plurality of source video feeds 82 (marked in the Figure as Video feed A, Video feed B, Video feed n), into the master 3D scene 80. In some cases, at least two source video feeds 82 can be captured at different source scenes 70, by different source image acquisition devices 130, as further detailed with respect to FIG. 7. In the illustrated example, there are shown two source scenes 70: source real-world scene A and source real-world scene B, however a larger number N of source scenes can exist, each providing a corresponding source video feed. Each source image acquisition device 130 can be controlled by control feeds provided by the computerized system 110, as detailed herein.

Further shown in the illustrated example, is the fact that each source video feed 82 can be inserted into multiple distinct locations within the master 3D scene 80. It is to be also noted that each source video feed 82 can be displayed or not displayed at different points in time during the combined video, according to manual instructions provided by the user through control device 360, or, optionally in accordance with at least one pre-determined rule.

In case of using pre-determined rules, when such rules are met, the computerized system 110 can be configured to display the source video feed 82 in its corresponding location, and when one or more of the rules are not met—the computerized system 110 can be configured not to display the source video feed 82 in its corresponding location. This can result in the source video feed 82 being displayed in its corresponding positions during certain time-windows during the combined video, whereas during other time-windows during the combined video—it will not be displayed in its corresponding pre-determined position within the master 3D scene 80.

In some cases, the pre-determined rules can depend on a distance of the master image acquisition device 140 from the corresponding position of the source video feed 82 inside the master 3D scene 80. For example, if the master image acquisition device 140 is located at a certain distance, above a certain threshold, from the corresponding position of the source video feed 82 inside the master 3D scene 80, the computerized system 110 can be configured not to display the source video feed 82 in its corresponding position within the master 3D scene 80.

In some cases, the pre-determined rules can depend on an angle between the master image acquisition device 140 and the corresponding position of the source video feed 82 inside the master 3D scene 80. For example, if the master image acquisition device 140 is located at a certain angle with respect to the corresponding position, above a certain low threshold or below a certain low threshold (e.g. above 150° or below 30°), the computerized system 110 can be configured not to display the source video feed 82 in its corresponding position within the master 3D scene 80.

It is to be noted that in some cases, the rules can depend on any combination of the above.

Having described the components of the system 110, attention is drawn to FIG. 14, showing a flowchart illustrating one example of a sequence of operations carried out for generating a combined video, of a master 3D scene with at least one source video feed inserted therein, in accordance with the presently disclosed subject matter.

According to certain examples of the presently disclosed subject matter, computerized system 110, e.g. utilizing source feeds placement module 250, can be configured to perform a combined video generation process 400. For this purpose, computerized system 110 can be configured to provide a master 3D scene 80 (block 410). The master 3D scene 80 can optionally be retrieved for this purpose from a data repository (that can be part of the computerized system, as detailed herein) or it can be received, optionally in real-time, from another source via a communication network 150 utilizing the network interface 220. As indicated herein, the master 3D scene can be a virtual computer-generated scene, or any other type of 3D scene (e.g. a 3D scene created using 3D real-world imaging techniques). In some cases, the master 3D scene can be a combination of real-world and computer-generated content.

The computerized system 110 is further configured to insert at least one source video feed 82, originating from a source image acquisition device 130, into at least one position within the master 3D scene 80. Inserting the at least one source video feed into the master 3D scene allows a configuration in which at least a first part of the master 3D scene 80 is in front of the source video feed 82 and at least a second part of the master 3D scene 80 is behind the source video feed 82 (block 420).

In some cases, the at least one position into which the source video feed 82 is inserted, can be pre-determined, e.g. by a user of the computerized system 110. In some cases, the source video feed 82 is inserted into a polygon placed within the master 3D scene, e.g. using billboarding techniques. The polygon can be placed inside the master 3D scene 80 so that it continuously faces a master image acquisition device 140 configured to capture a video of the master 3D scene 80 as further detailed herein. In some cases, the scale of the inserted polygon comprising the source video feed 82 is maintained constant within the master 3D scene 80, irrespective of the distance of the master image acquisition device 140 from such polygon.

In some cases, a plurality of source video feeds 82, optionally captured at a plurality of source scenes 70, can be inserted into the master 3D scene. In some cases, one or more of the source video feeds can be inserted into multiple positions within the master 3D scene 80. For example, a first source video feed captured at a first source scene can be inserted into one or more positions within the master 3D scene 80, and a second source video feed captured at a second source scene (that can optionally be in a different geographical location remote from the first source scene geographical location) can be inserted into one or more other positions within the master 3D scene 80.

In accordance with another example of the presently disclosed subject matter, the master 3D scene can include a printing system. A first source video of a first presenter (e.g. a technician), can be inserted into a first position within the 3D scene, e.g. next to a first component of the printing system. The same source video feed can optionally also be inserted into a second position within the master 3D scene, other than the first position, e.g. next to a second component of the printing system. Additionally, or alternatively, a second source video feed, of a second presenter (e.g. another technician), can be inserted into the second position within the master 3D scene, e.g. next to a second component of the printing system. This can enable creation of a video in which one or more source video feeds of presenters are positioned near certain parts of the printing system, enabling providing a demonstration of the printing system operation, and/or providing assistance to, or tutoring of, users of the printing system by the presenters, that can optionally be physically located remotely. A more detailed explanation is provided with reference to FIG. 20.

Returning to the flowchart of FIG. 14, the computerized system 110 can be configured to generate a combined video of the master 3D scene 80, with the at least one source video feed 82 inserted therein at block 420 (block 430). The combined video is generated by a master image acquisition device 140, that views the master 3D scene 80, and any source video feed 82 inserted therein. It is to be noted that the source video feed can be provided to the computerized system 110, and placed within the master 3D scene 80 in real-time, and the combined video can be generated by the computerized system 110 in real-time.

In some cases, the computerized system 110 can be configured to maintain each source video feed 82 inserted into the master 3D scene 80 continuously facing the master image acquisition device 140, even if the master image acquisition device 140 moves (changes its position and/or orientation) during generating the combined video. Maintaining the inserted source video feed facing the master image acquisition device 140 can be accomplished by rotating it around any of its axis (X and/or Y and/or Z).

In order to emphasize the meaning of inserting the source video feed 82 into the master 3D scene 80, it is to be noted that in some cases during at least a first time-window of the combined video, the source video feed 82 inside the master 3D scene 80 is at least partially occluded by at least one object within the master 3D scene 80 and during at least a second time-window of the combined video the source video feed 82 at least partially occludes the same object, and/or another object, of the master 3D scene 80. In some cases, the first time-window and the second time-window at least partially overlap.

In order to further understand the results of inserting source video feeds into the master 3D scene 80, it is to be noted that in some cases a first source video feed and a second source video feed are inserted into the master 3D scene 80, each into a different position therein. This enables a situation in which during at least a first time-window of the combined video the first source video feed is at least partially occluded by the second source video feed, and during at least a second time-window of the combined video the second source video feed is at least partially occluded by the first source video feed.

As indicated herein, in some cases, the given source video feed placed inside the master 3D scene 80 can be, or include, a cut-out of a real-world object. The cut-out can optionally be automatically extracted from the video captured by a source image acquisition device 130, e.g. using software algorithms. In some cases, the real-world object extracted from the video captured by the source image acquisition device 130 is a person.

It is to be noted that the source image acquisition device 130 can be a real-world video camera, and the source video feed 82 can be a real-world video feed, or a cutout therefrom. In such cases, the source video feed 82 can optionally further include one or more virtual objects virtually placed therein, using known methods and/or techniques. In other cases, the source image acquisition device 130 can be a virtual camera, and the source video feed 82 can be a virtual video feed. In such cases, the source video feed 82 can optionally further include one or more real-world objects placed therein or superimposed thereon, using known methods and/or techniques, or using a system according to the presently disclosed subject matter.

It is to be further noted that in some cases the master image acquisition device 140 can be a virtual video camera, and the master 3D scene 80 can be a virtual 3D scene created using computer graphics. In such cases, the master 3D scene 80 can include at least one real-world object placed therein or superimposed thereon, using known methods and/or techniques, or using a system according to the presently disclosed subject matter. In other cases, the master image acquisition device 140 can be a real-world video camera, and the master 3D scene 80 can be a real-world scene of a real-world 3D movie. In such cases, the master 3D scene 80 can optionally include at least one virtual object virtually placed therein, using known methods and/or techniques, or using a system according to the presently disclosed subject matter.

In some cases, the source video feed 82 can be a 3D video feed. In other cases, the source video feed 82 can be a two-dimensional video feed, optionally with additional depth information.

In some cases, the master 3D scene includes a real or virtual representation of at least part of a printing system, as described herein with reference to FIG. 14.

It is to be noted, with reference to FIG. 14, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Turning to FIG. 15, there is shown a flowchart illustrating one example of a sequence of operations carried out for maintaining synchronicity between a scene POV and a video feed POV while generating a combined video, in accordance with the presently disclosed subject matter.

According to certain examples of the presently disclosed subject matter, computerized system 110, e.g. utilizing positioning module 240, can be configured to perform a source image acquisition device positioning process 500. For this purpose, computerized system 110 can be configured to obtain information indicative of one or more scene Point of View (POV) changes being changes of the master image acquisition device's 140 POV of the master 3D scene 80 (block 510). The information can be retrieved from data repository (that can be part of the computerized system, as detailed herein) or received from another source, such as control device 360, optionally in real-time. In some cases, the information can be received via a communication network 150 utilizing the network interface 220.

It is to be noted that each scene POV change defines a corresponding master image acquisition device 140 POV of the master 3D scene 80. The information can further enable determining, for each scene POV change, a corresponding point-in-time in the combined video in which the scene POV change will occur.

The information indicative of the one or more scene POV changes can originate from various sources. For example, the master 3D scene 80 can be a real-world scene captured by real-world image acquisition devices, such as video cameras and/or any other devices capable of acquiring images that can form the video of the master 3D scene 80. In such cases, it is required to generate the information relating to the scene POV changes during acquisition of the video, e.g. utilizing various camera movement tracking mechanisms, such as ones utilizing arbitrary defined reference points having known coordinates within the master 3D scene (e.g. match-moving techniques). Such information relating to the scene POV changes can be stored, for example, as metadata in the video recording file along the video recording, or in metadata files accompanying the video recording file. The metadata can include, for example, for each frame (being for example a give still image of the still images which compose the video) of the video of the master 3D scene, (1) three X,Y,Z coordinates of the real-world image acquisition device, which are defining the real-world image acquisition device position relative to the arbitrary chosen reference points in the real-world master 3D scene 80 and (2) pitch, roll and yaw angles which are defining the real-world image acquisition device orientation relative to the arbitrary chosen reference points in the real-world master 3D scene 80. It is to be noted that in some cases, the real-world image acquisition device capturing the real-world master 3D scene 80 can optionally be mounted on a movable device 120 (e.g. a flying drone).

In other cases, the master 3D scene can be a virtual scene, e.g. a 3D CG scene, rendered by virtual cameras. In such cases, information of the scene POV changes can be generated by the software used to generate the 3D CG scene.

Attention is drawn back to the source image acquisition device positioning process 400. Based on the obtained information, computerized system 110 can be configured to automatically determine, for each of the scene POV changes, corresponding real-world movements groups (including movements in at least one degree of freedom) of a source image acquisition device 130 configured for capturing the source video feed 82 (block 520) and to provide instructions to perform the real-world movements groups, wherein performing each of the real-world movements groups results in a video feed POV change (block 530). It is to be noted that each video feed POV change is a change of the source image acquisition device's 130 POV, that is substantially identical (as in some cases a certain discrepancy, e.g. of up to five, ten, fifteen, or twenty degrees in each direction, can be allowed) to the scene POV change, and each video feed POV change defines a corresponding video feed POV, being the source image acquisition device's 130 POV of at least one real-world object within the source scene 70.

It is to be noted that the instructions of block 530 can be provided to the source image acquisition device 130 itself or to a movable device 120 on which the source image acquisition device 130 is mounted, or to any other device capable of carrying out the instructions for performing the real-world movements groups.

It is to be further noted that the instructions are provided for maintaining synchronicity between the scene POV and the video feed POV while generating the combined video. The computerized system 110 can therefore be further configured to synchronize the timing of performing the scene POV changes and the corresponding video feed POV changes. As indicated above, the information obtained at block 510 can further enable determining, for each scene POV change, a corresponding point-in-time in the combined video in which the scene POV change will occur. In some cases, the information about the scene POV changes is therefore provided before the scene POV changes are actually performed (i.e. before the master image acquisition device 140 is actually moved) during acquisition of the combined video. This enables the computerized system to provide the instructions of block 530 at points-in-time that enable moving the source image acquisition device 130 while maintaining the scene POV and the video feed POV synchronized during generating the combined video.

In other words, the computerized system is configured to obtain points-in-time corresponding to each of the scene POV changes, and to provide the instructions of block 530 at each of said points-in-time during acquisition of the source video feed 82, enabling thereby the source image acquisition device 130 to timely perform the real-world movements group, corresponding to the movements group made by the master image acquisition device 140, while maintaining synchronicity between the scene POVs and the video feed POVs over time.

It is to be noted that the instructions to perform the real-world movement groups can be provided before the movable device 120 is required to make the real-world movement groups (along with the points-in-time each real-world movement group is to be made, so that the movable device 120, or any other device capable of instructing the movable device 120, can determine when to perform each real-world movement group), or in real-time, so that each instruction to perform a real-world movement group is provided substantially (in some cases a certain degree of time difference, e.g. up to one, two, three, five, or ten seconds can be acceptable) when it is to be performed (i.e. a point-in-time of the source video feed 82 captured by the source image acquisition device 130 that corresponds to the point-in-time of the corresponding scene POV change).

It is to be noted, with reference to FIG. 15, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

As indicated herein, computerized system 110 can be configured to provide instructions to cause a movable device 120 to perform one or more of the real-world movement groups for changing the video feed POV. FIG. 16 is a flowchart illustrating one example of a sequence of operations carried out by a movable device 120 for changing a source image acquisition device POV of at least one real-world object within a source video feed (also referred to as "video feed POV"), in accordance with the presently disclosed subject matter.

As indicated above, the source image acquisition device 130 and/or the movable device 120 and/or or any other device capable of instructing the movable device 120 to perform real-world movements, can further comprises a controller 320. The controller 320 can optionally be distributed between the source image acquisition device 130 and/or the movable device 120, and/or any other device capable of instructing the movable device 120 to perform real-world movements.

According to certain examples of the presently disclosed subject matter, controller 320 can be configured to perform a video feed POV change process 600, e.g. utilizing the movements control module 330. For this purpose, controller 320 can be configured to receive instructions for performing real-world movements group for moving the source image acquisition device 130 mounted thereon (block 610). The source image acquisition device 130 being capable of capturing at least one source video feed 82 from a video feed POV (being the source image acquisition device 130 POV of at least one real-world object within the source scene 70), the real-world movements group being substantially identical (as in some cases a certain discrepancy, e.g. of up to five, ten, fifteen, or twenty degrees in each direction, can be allowed) to movements made by a master image acquisition device 140 for changing a corresponding scene POV (being the master image acquisition device's 140 POV of the master 3D scene 80). The received instructions for performing real-world movements group can be received from the computerized system 110, as detailed herein with reference to block 530.

Movable device 120 can be further configured to perform the real-world movements group for changing the source video feed POV (being the source image acquisition device 130 POV of at least one real-world object within the source scene 70) so that it is substantially identical (as in some cases a certain discrepancy, e.g. of up to five, ten, fifteen, or twenty degrees in each direction, can be allowed) to the corresponding scene POV (being the master image acquisition device's 140 POV of the master 3D scene 80) (block 620).

It is to be noted that, with reference to FIG. 14, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Figure 18:
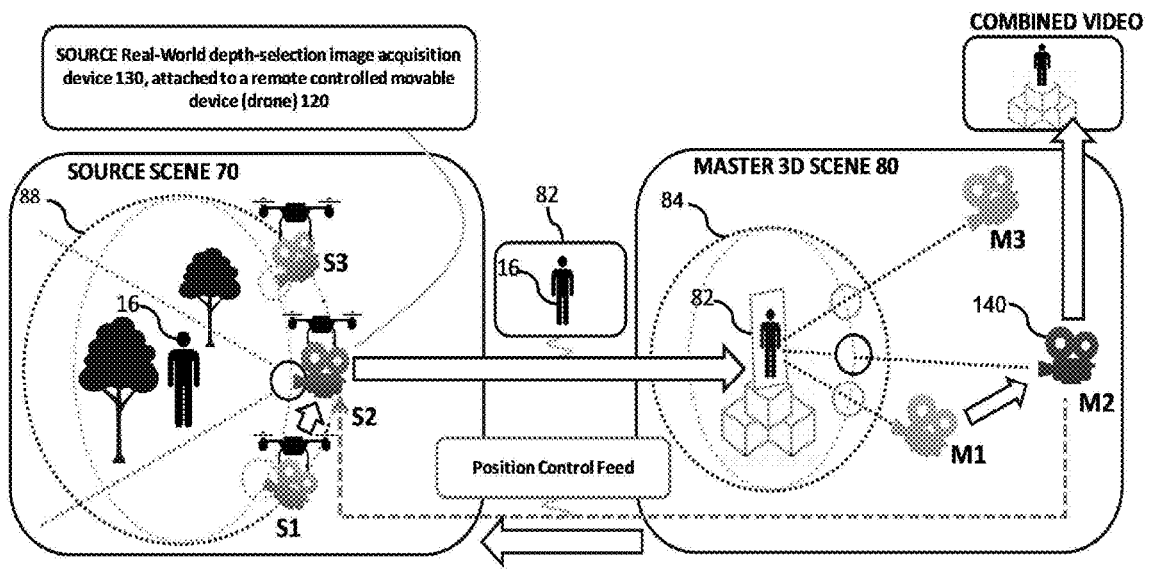
FIG. 18 is a schematic illustration of an exemplary operation of a computerized system for synchronizing a scene POV and a video feed POV, in accordance with the presently disclosed subject matter.

Turning to FIG. 18, there is shown a schematic illustration of an exemplary operation of a computerized system for synchronizing a scene POV and a video feed POV, in accordance with the presently disclosed subject matter.

As indicated above, the synchronicity between the master image acquisition device 140 POV of the master 3D scene 80 and the source image acquisition device 130 POV of the at least one real-world object is required to be maintained (or substantially maintained). Such synchronicity is maintained by making changes to the source image acquisition device 130 POV of the at least one real-world physical object in the source scene 70 in a manner substantially identical (as in some cases a certain discrepancy, e.g. of up to five, ten, fifteen, or twenty degrees in each direction, can be allowed) to the change of the master image acquisition device 140 POV of the master 3D scene 80.

However, as further detailed above, in some cases:
(a) The scale of the inserted source video feed 82 within the master 3D scene is maintained substantially constant (some minor changes, for example of ±10%, may be acceptable, optionally depending on the content of the scene); and
(b) The source image acquisition device 130 is also required to maintain a constant scale of the at least one real-world physical object. Therefore, the distance between the source image acquisition device 130 and the at least one real-world object of the source video feed is maintained substantially constant (some minor changes, for example of ±10%, may be acceptable, optionally depending on the content of the scene), even if the master image acquisition device 140 moves closer to, or away from, the inserted video feed 82.

(a) and (b) enable synchronizing the scales of the objects 86 and the inserted video feed 28 when the master image acquisition device 140 zooms in or out or moves closer to or away from the objects 86 and/or the inserted video feed 82.

Looking at the illustrated example, it can be appreciated that the source image acquisition device 130 maintains a constant distance from the person (being a real-world physical object within the source scene 70). Therefore, the movements of the source image acquisition device 130 are confined to the surface of a first imaginary sphere 88. In order to determine where to position the source image acquisition device 130 on the surface of the first imaginary sphere 88, a vector is projected from the master image acquisition device 140 onto a second imaginary sphere 84 around the inserted video feed 82. The scale of the second imaginary sphere 84 is adjusted in accordance with the scale of the video feed inserted into the master 3D scene, so that the relation between the first imaginary sphere 88 and the source video feed extracted from the source scene 70 is similar to the relation between the second imaginary sphere 84 and the source video feed inserted into the master 3D scene 80.

Figure 19:
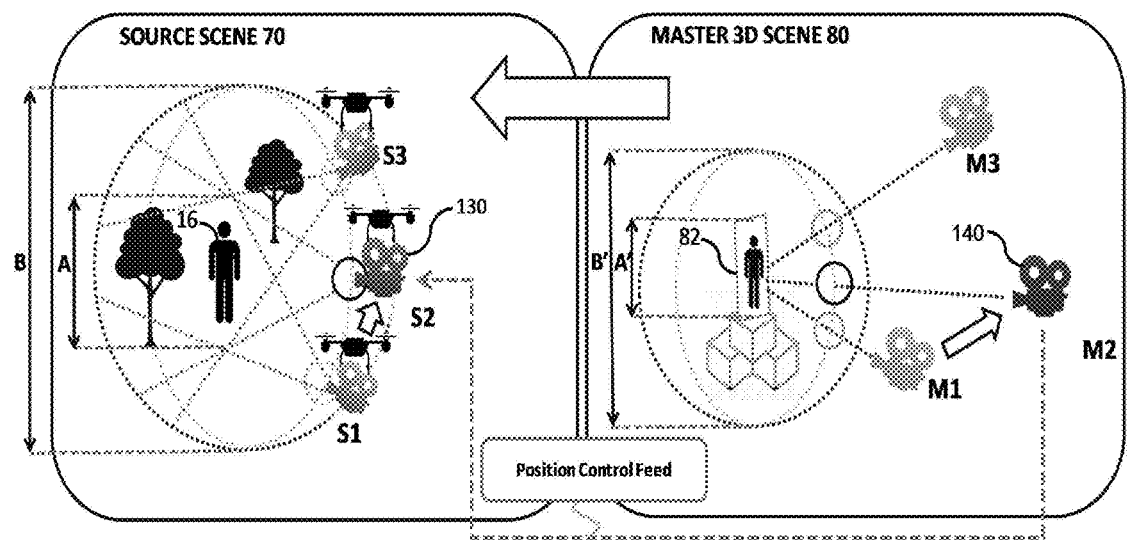
FIG. 19 is another schematic illustration of an exemplary operation of a computerized system for synchronizing a scene POV and a video feed POV, in accordance with the presently disclosed subject matter.

This is further illustrated by FIG. 19, where:
(a) The scale of the source video feed 82 extracted from the source scene 70 is marked A;
(b) The scale of the first imaginary sphere 88 is marked B;
(c) The scale of the source video feed inserted into the master 3D scene is marked A'; and
(d) The scale of the second imaginary sphere 84 is marked B'.

According to the presently disclosed subject matter, A/B equals A'/B'. It is to be noted that in some cases a certain tolerance is allowed. In some cases, the tolerance can be of up to 5%, up to 10%, up to 20%, or up to 30%.

Returning to FIG. 18, looking at an exemplary scene POV change, when in position M1, master image acquisition device M gives advance positional control feed to source image acquisition device S which is in position 51, to move into position S2. Position S2 is calculated by projecting the vector of camera M2 onto the second imaginary sphere 84 positioned/calculated around the source video feed 82.

Figure 20:
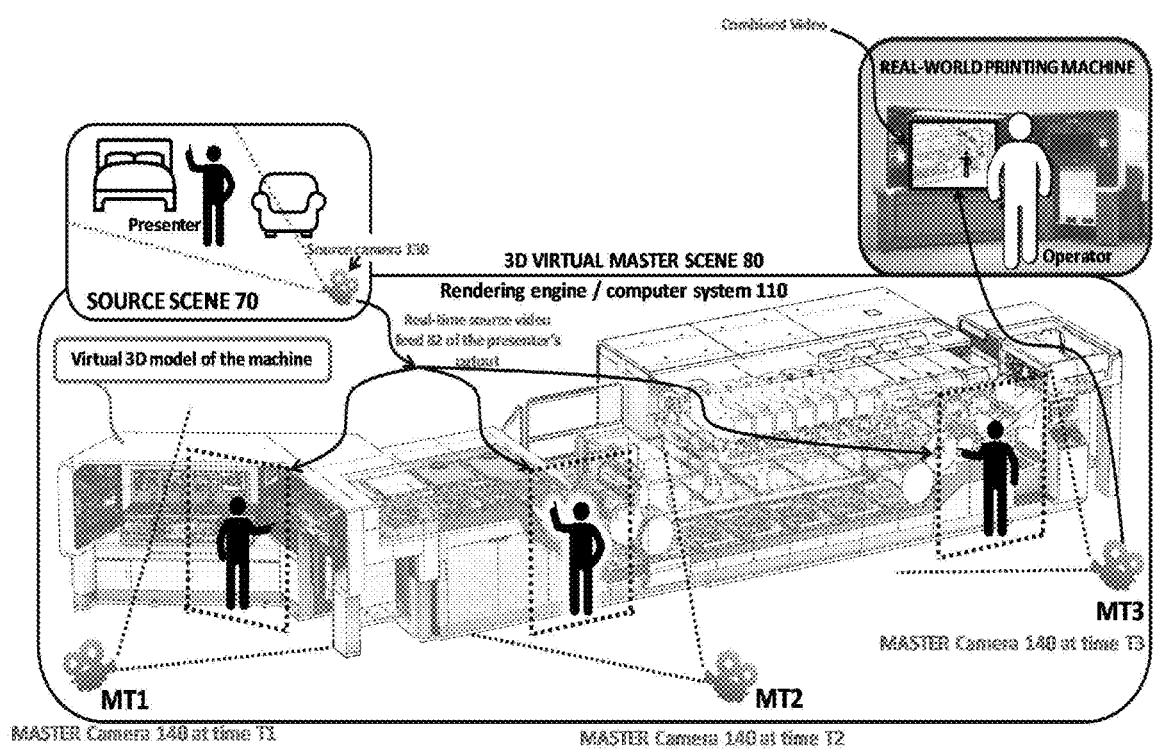
FIG. 20 is a schematic illustration of an exemplary operation of a virtual demo center (VDC) to be used with a printing system, in accordance with the presently disclosed subject matter.

Turning to FIG. 20, there is shown a schematic illustration of an exemplary operation of a virtual demo center (VDC) to be used with a printing system, in accordance with the presently disclosed subject matter.

In this illustrated example, there is provided a virtual master 3D scene 80, comprising a complete model of a printing system. Although in the illustrated example there is provided a full model of the printing system, in some cases a partial model can be provided. In addition, although in the illustrated example the model is a virtual model, in some cases a real-world master 3D scene comprising a real-world 3D printing system representation can be provided.

The computerized system 110 can receive a source video feed 82, that in the illustrated example is a cut-out of a presenter from a video captured by source image acquisition device 130. The source video feed 82 can be inserted into multiple locations within the master 3D scene 80. In the illustrated example the source video feed 82 is inserted into three different positions within the master 3D scene 80. It is to be noted that inserting the source video feed 82 into the master 3D scene 80 allows a configuration in which at least a first part of the master 3D scene 80 is in front of the presenter and at least a second part of the master 3D scene 80 is behind the presenter. In the illustrated example, the printing system is behind the presenter from the point of view of the master image acquisition device 140, and a certain portion of the floor is in front of the presenter from the point of view of the master image acquisition device 140.

The computerized system 110 is further configured to generate a combined video comprising the master 3D scene 80 including the real or virtual representation of at least part of the printing system and the inserted source video feed 82 of the presenter.

When the master image acquisition device 140 is positioned in position MT1, at time T1, it captures a combined video of a certain part of the model of the printing system comprised within the master 3D scene 80, and the specific source video feed 82 that is visible from its POV of the master 3D scene 80. Then, when the master image acquisition device 140 moves to position MT2, at time T2, it captures a combined video of another part of the model of the printing system comprised within the master 3D scene 80, and another source video feed 82 that is now visible from its new POV of the master 3D scene 80. Finally, when the master image acquisition device 140 moves to position MT3, at time T3, it captures a combined video of yet another part of the model of the printing system comprised within the master 3D scene 80, and yet another source video feed 82 that is now visible from its new POV of the master 3D scene 80.

An operator of a real-world printing system, similar, or identical, to the modeled printing system comprised within the master 3D scene 80, can view the combined video on a display of the real-world printing system, which enables, inter alia, providing such operator with demonstrations and/or assistance, optionally in real-time, for operating the printing system. The presenter can be located anywhere, including remotely from the real-world printing system, and irrespective of the setting of the scene in which the presenter is located, the operator of the printing system will see him as if he is inside the master 3D scene comprising the modeled printing system.

It is to be noted that in some cases, the source video feed 82 can be inserted to a single position within the master 3D scene 80 at any given point-in-time. In other cases, the source video feed 82 can be inserted to multiple positions within the master 3D scene 80 simultaneously. In such cases, some of the source video feeds 82 within the master 3D scene can be displayed, optionally simultaneously, and some may not be displayed (i.e. be hidden). In some cases, the determination on which source video feeds 82 to display and which source video feeds 82 not to display can be based on rules, as detailed herein, with reference to FIG. 13.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A virtual demo center (VDC) to be used with a printing system, the VDC comprises a processor configured to:
provide a master Three-Dimensional (3D) scene, comprising a real or virtual representation of at least part of the printing system;
insert at least one source video feed of a presenter into at least one position within the master 3D scene, allowing a configuration in which at least a first part of the master 3D scene is in front of the presenter and at least a second part of the master 3D scene is behind the presenter; and
generate a combined video comprising the master 3D scene including the real or virtual representation of at least part of the printing system and the inserted video feed of the presenter, wherein the processor is further configured to:

obtain information indicative of one or more scene Point of View (POV) changes being changes of a master image acquisition device's POV of the master 3D scene;

automatically determine, based on the obtained information, for each of the scene POV changes, corresponding real-world movements groups of a source image acquisition device configured for capturing the source video feed; and provide instructions to perform the real-world movements groups, wherein performing each of the real-world movements groups results in a video feed POV change;

wherein:
(a) each of the scene POV changes results in a corresponding scene POV being the master image acquisition device's POV of the master 3D scene;
(b) each video feed POV change being a change of the source image acquisition device's POV, that is substantially identical to the scene POV change, and each video feed POV change defines a corresponding video feed POV, being the source image acquisition device's POV of at least one real-world object; and
(c) the instructions are provided for maintaining synchronicity between the scene POV and the video feed POV while generating the combined video.

2. The system of claim 1 wherein the information indicative of one or more scene POV changes is obtained before the scene POV changes are made.

3. The system of claim 1 wherein a scale of the inserted source video feed is substantially constant and wherein a distance of the source image acquisition device from the at least one real-world object is substantially constant, independent of the distance of the master image acquisition device from the inserted source video feed.

4. The system of claim 1 wherein the processor is further configured to rotate the inserted source video feed upon movement of the master image acquisition device so that the inserted source video feed continuously faces the master image acquisition device.

5. The system of claim 1 wherein the at least one source video feed is inserted into at least two different positions within the master 3D scene.

6. The system of claim 1, wherein the source image acquisition device is mounted on a movable device configured to perform the real-world movements group.

7. The system of claim 6, wherein the movable device is a flying drone.

8. The system of claim 2, wherein the processor is further configured to obtain points-in-time corresponding to each of the scene POV changes, and wherein the instructions to perform each of the real-world movements groups are provided at each of said points-in-time during acquisition of the source video feed, enabling thereby the source image acquisition device to timely perform the corresponding real-world movements group while maintaining synchronicity between the scene POVs and the video feed POVs.

* * * * *